(12) United States Patent
Brncick et al.

(10) Patent No.: US 8,827,371 B2
(45) Date of Patent: Sep. 9, 2014

(54) VEHICLE SEAT CUSHION WITH INFLATABLE SUPPORT

(75) Inventors: Gregory Brncick, Holland, MI (US); Dana J. Lowell, Holland, MI (US); Leonardo Gomes, Rochester Hills, MI (US)

(73) Assignee: Faurecia Automotive Seating, LLC, Troy, MI (US)

( * ) Notice: Subject to any disclaimer, the term of this patent is extended or adjusted under 35 U.S.C. 154(b) by 0 days.

(21) Appl. No.: 13/511,416

(22) PCT Filed: Nov. 17, 2010

(86) PCT No.: PCT/US2010/057048
§ 371 (c)(1),
(2), (4) Date: May 23, 2012

(87) PCT Pub. No.: WO2011/068684
PCT Pub. Date: Jun. 9, 2011

(65) Prior Publication Data
US 2012/0280554 A1 Nov. 8, 2012

Related U.S. Application Data

(60) Provisional application No. 61/266,044, filed on Dec. 2, 2009.

(51) Int. Cl.
*A47C 7/14* (2006.01)
*A47C 7/18* (2006.01)

(52) U.S. Cl.
USPC .................. 297/452.41; 297/452.48

(58) Field of Classification Search
USPC ........................ 297/452.41, 452.48
See application file for complete search history.

(56) References Cited

U.S. PATENT DOCUMENTS

| | | | | |
|---|---|---|---|---|
| 2,987,735 A | * | 6/1961 | Nail | 428/12 |
| 3,171,691 A | * | 3/1965 | Buehrig | 297/452.54 |
| 3,231,454 A | * | 1/1966 | Williams | 428/132 |
| 3,326,601 A | * | 6/1967 | Parkinson et al. | 297/284.6 |
| 3,348,880 A | * | 10/1967 | Swann | 297/228.13 |
| 3,902,754 A | * | 9/1975 | Braeuning | 297/328 |
| 4,518,643 A | * | 5/1985 | Francis | 428/131 |
| 4,555,140 A | * | 11/1985 | Nemoto | 297/452.54 |
| 4,580,837 A | * | 4/1986 | Bayley | 297/362.12 |
| 4,746,168 A | * | 5/1988 | Bracesco | 297/440.2 |
| 4,826,249 A | * | 5/1989 | Bradbury | 297/452.41 |
| 4,965,899 A | * | 10/1990 | Sekido et al. | 297/284.6 |
| 5,052,068 A | * | 10/1991 | Graebe | 5/654 |
| 5,243,722 A | * | 9/1993 | Gusakov | 5/655.3 |
| 5,288,136 A | * | 2/1994 | Webber et al. | 297/440.11 |
| 5,369,828 A | * | 12/1994 | Graebe | 5/654 |
| 5,419,612 A | * | 5/1995 | Rassekhi | 297/200 |
| 5,444,881 A | * | 8/1995 | Landi et al. | 5/708 |
| 5,461,741 A | * | 10/1995 | Graebe | 5/654 |
| 5,518,802 A | * | 5/1996 | Colvin et al. | 428/178 |
| 5,572,804 A | * | 11/1996 | Skaja et al. | 36/29 |

(Continued)

OTHER PUBLICATIONS

Search Report and Written Opinion issued in connection with PCT/US2010/057048 and completed by the ISA/US on Jan. 11, 2011.

*Primary Examiner* — Rodney B White
(74) *Attorney, Agent, or Firm* — Reising Ethington P.C.

(57) ABSTRACT

A cushion is adapted to set on a seat pan included in a vehicle seat. The cushion includes an inflatable air bag in, for example, a lumbar-support device.

11 Claims, 22 Drawing Sheets

(56) References Cited

U.S. PATENT DOCUMENTS

| | | | |
|---|---|---|---|
| 5,617,595 A * | 4/1997 | Landi et al. | 5/653 |
| 5,637,076 A * | 6/1997 | Hazard et al. | 601/5 |
| 5,638,565 A * | 6/1997 | Pekar | 5/710 |
| 5,660,438 A * | 8/1997 | Tedesco | 297/284.6 |
| 5,689,845 A * | 11/1997 | Sobieralski | 5/654 |
| 5,806,928 A * | 9/1998 | Gattuso et al. | 297/284.6 |
| 5,845,352 A * | 12/1998 | Matsler et al. | 5/654 |
| 5,927,807 A * | 7/1999 | Heller | 297/284.3 |
| 5,975,629 A * | 11/1999 | Lorbiecki | 297/200 |
| 5,976,451 A * | 11/1999 | Skaja et al. | 264/516 |
| 6,029,962 A * | 2/2000 | Shorten et al. | 267/145 |
| 6,098,313 A * | 8/2000 | Skaja | 36/28 |
| 6,212,719 B1 * | 4/2001 | Thomas et al. | 5/713 |
| 6,390,553 B1 * | 5/2002 | LeBlanc | 297/284.6 |
| 6,502,263 B1 * | 1/2003 | Rowley et al. | 5/654 |
| 6,551,450 B1 * | 4/2003 | Thomas et al. | 156/580.1 |
| 6,623,080 B2 * | 9/2003 | Clapper | 297/452.41 |
| 6,777,062 B2 * | 8/2004 | Skaja | 428/143 |
| 6,901,617 B2 * | 6/2005 | Sprouse et al. | 5/654 |
| 7,033,666 B2 * | 4/2006 | Skaja | 428/178 |
| 7,306,081 B2 * | 12/2007 | Tamada et al. | 188/377 |
| 7,320,503 B2 * | 1/2008 | Eysing | 297/452.63 |
| 7,574,760 B2 * | 8/2009 | Foley et al. | 5/655.7 |
| 2002/0050077 A1 * | 5/2002 | Wang et al. | 36/28 |
| 2002/0056709 A1 * | 5/2002 | Burt | 219/217 |
| 2002/0119276 A1 * | 8/2002 | Skaja | 428/44 |
| 2003/0030319 A1 * | 2/2003 | Clapper | 297/452.41 |
| 2004/0067820 A1 * | 4/2004 | Noble et al. | 482/18 |
| 2004/0245811 A1 * | 12/2004 | Bevan et al. | 297/180.12 |
| 2005/0017565 A1 * | 1/2005 | Sprouse, II | 297/452.41 |
| 2005/0074586 A1 * | 4/2005 | Skaja | 428/174 |
| 2005/0126038 A1 * | 6/2005 | Skaja et al. | 36/25 R |
| 2005/0151410 A1 * | 7/2005 | Sprouse, II | 297/452.41 |
| 2006/0177635 A1 * | 8/2006 | Pepe et al. | 428/174 |
| 2006/0277685 A1 * | 12/2006 | Foley et al. | 5/653 |
| 2008/0166524 A1 * | 7/2008 | Skaja et al. | 428/166 |
| 2010/0207443 A1 * | 8/2010 | Brncick | 297/452.48 |

\* cited by examiner

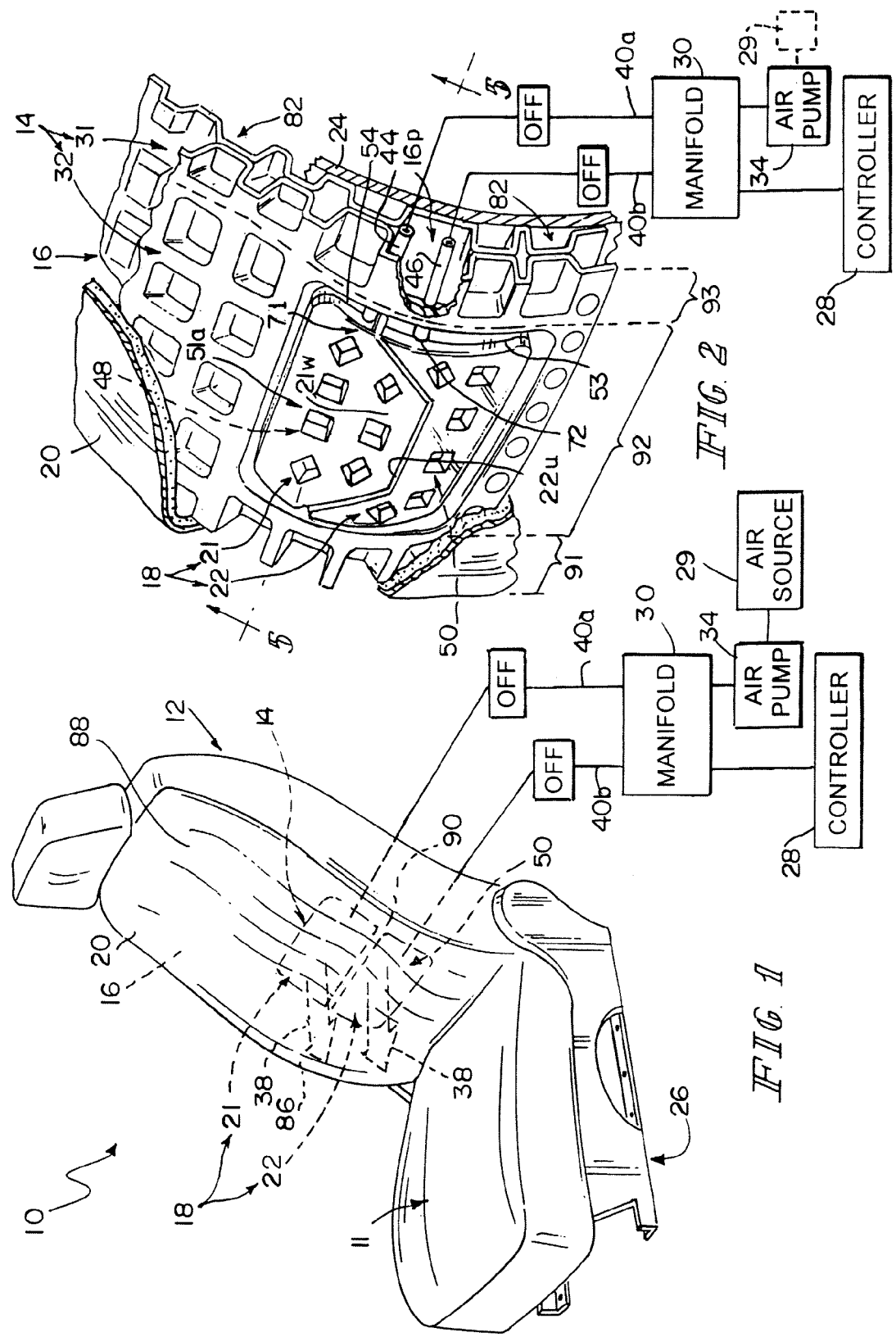

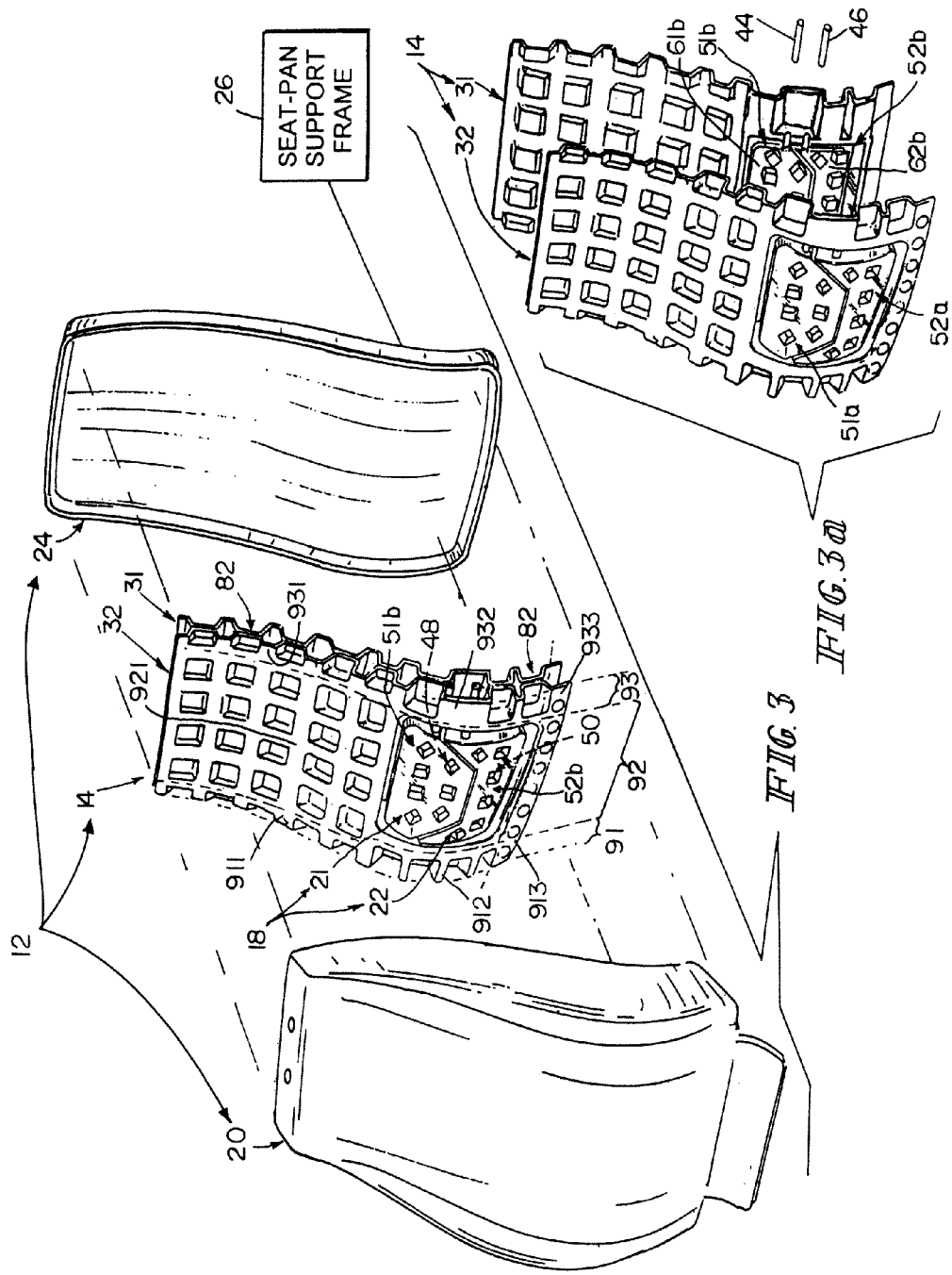

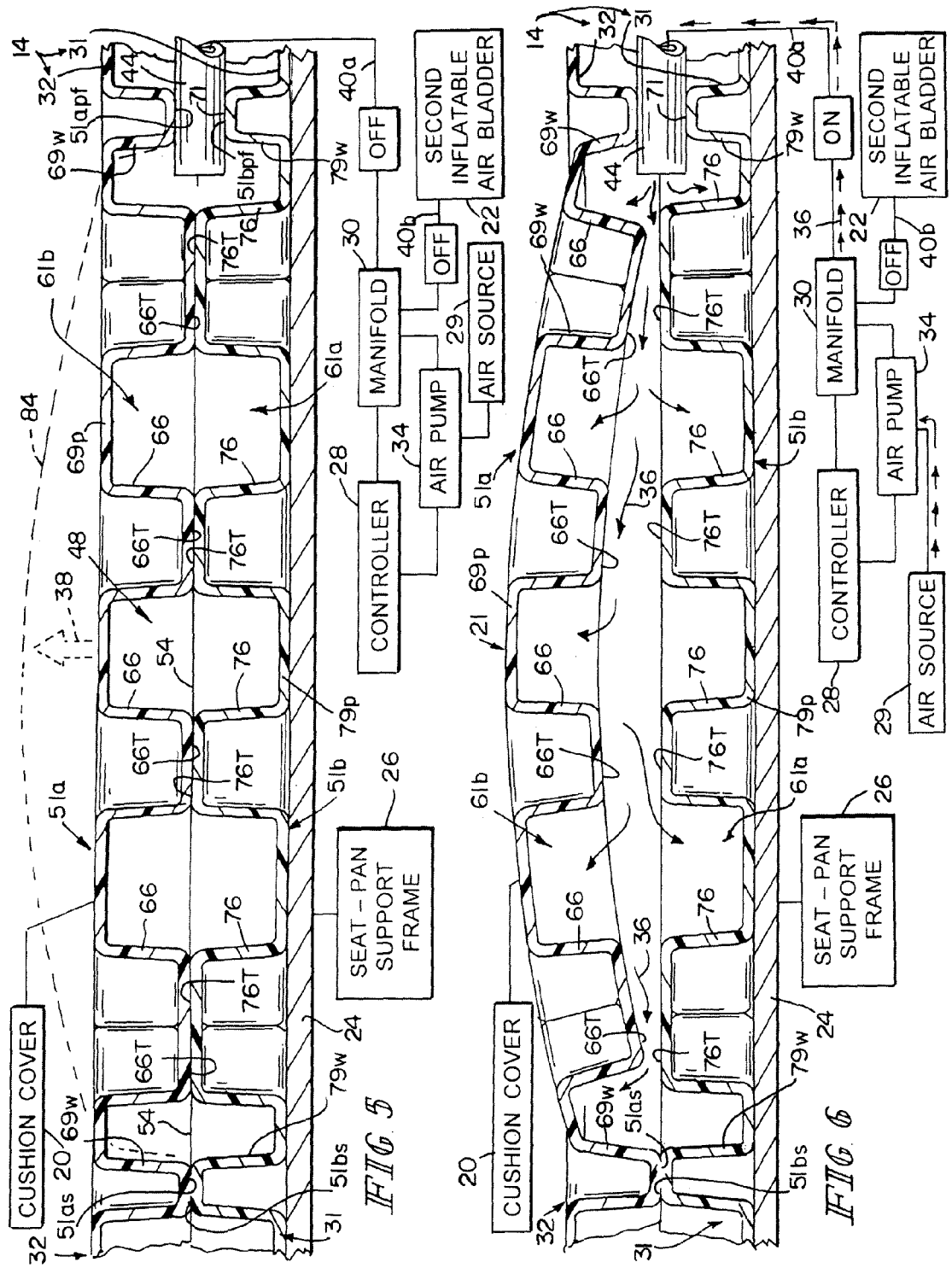

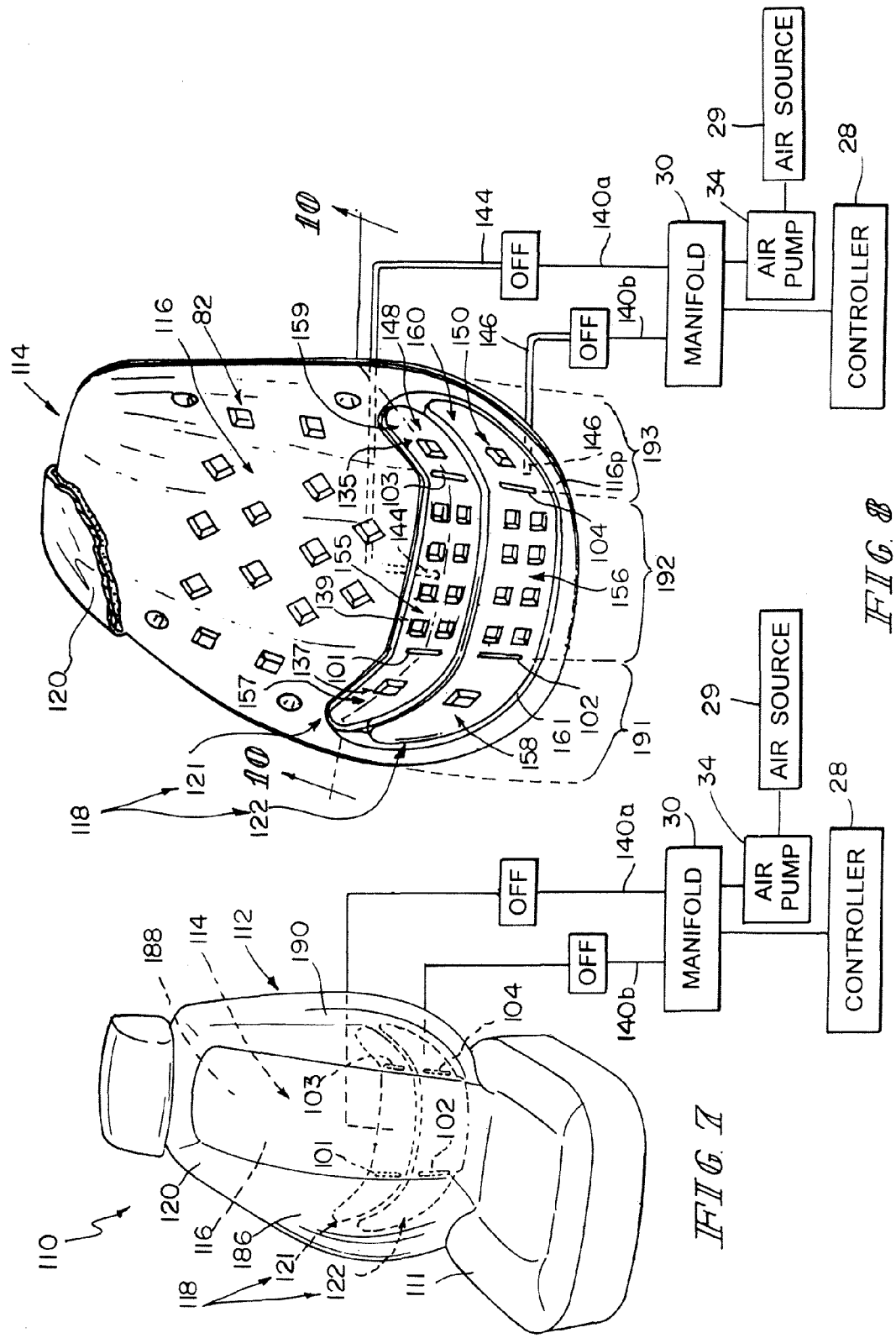

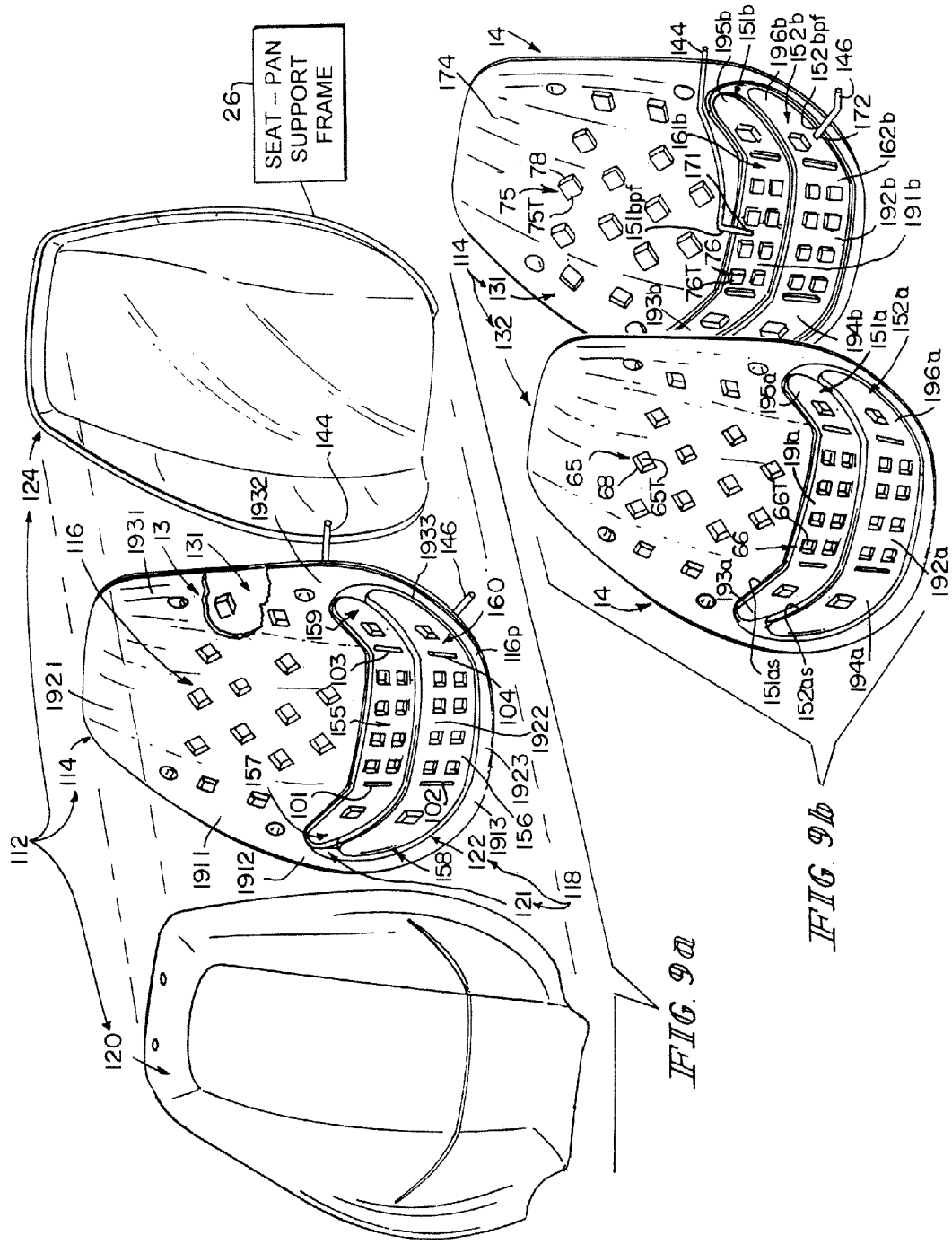

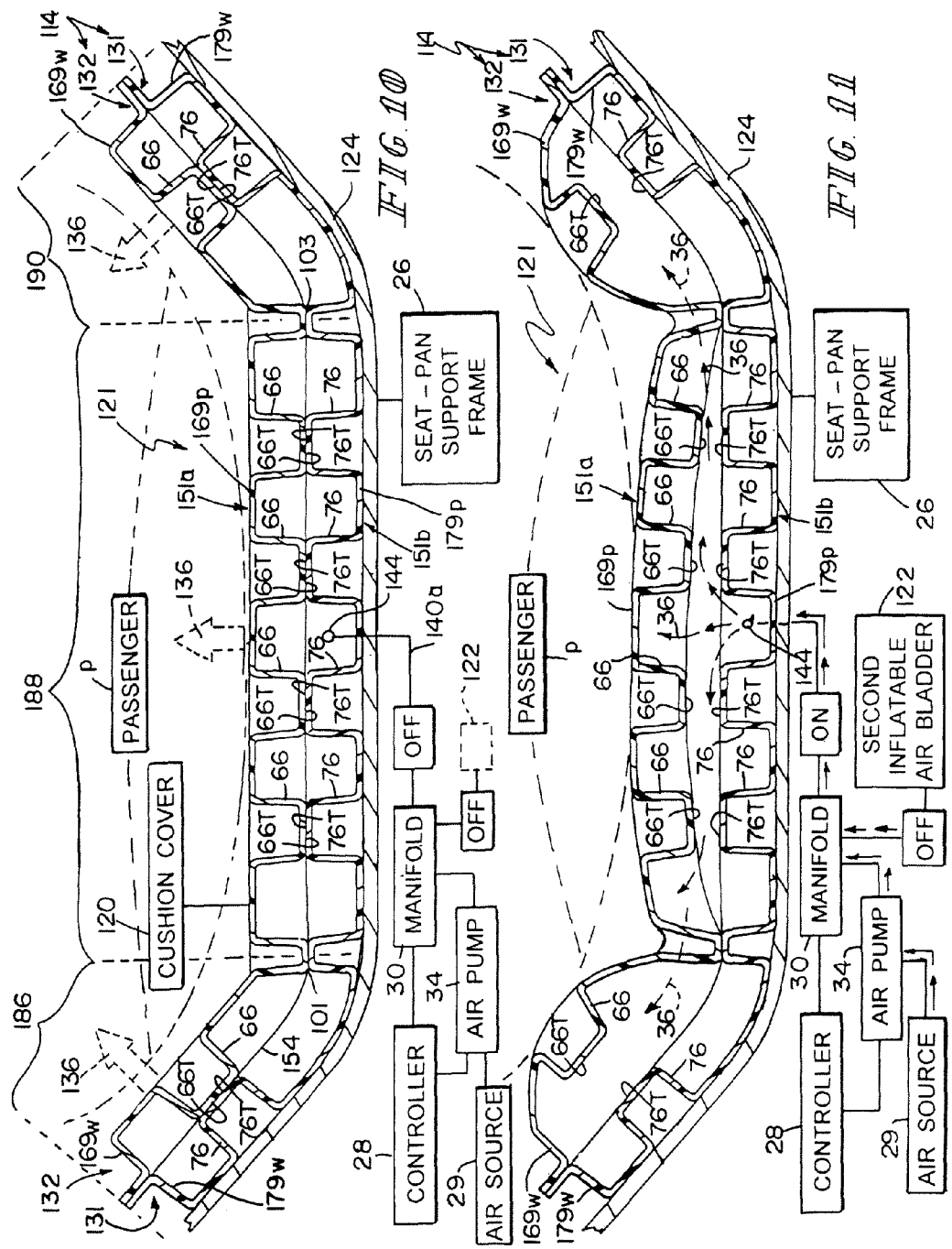

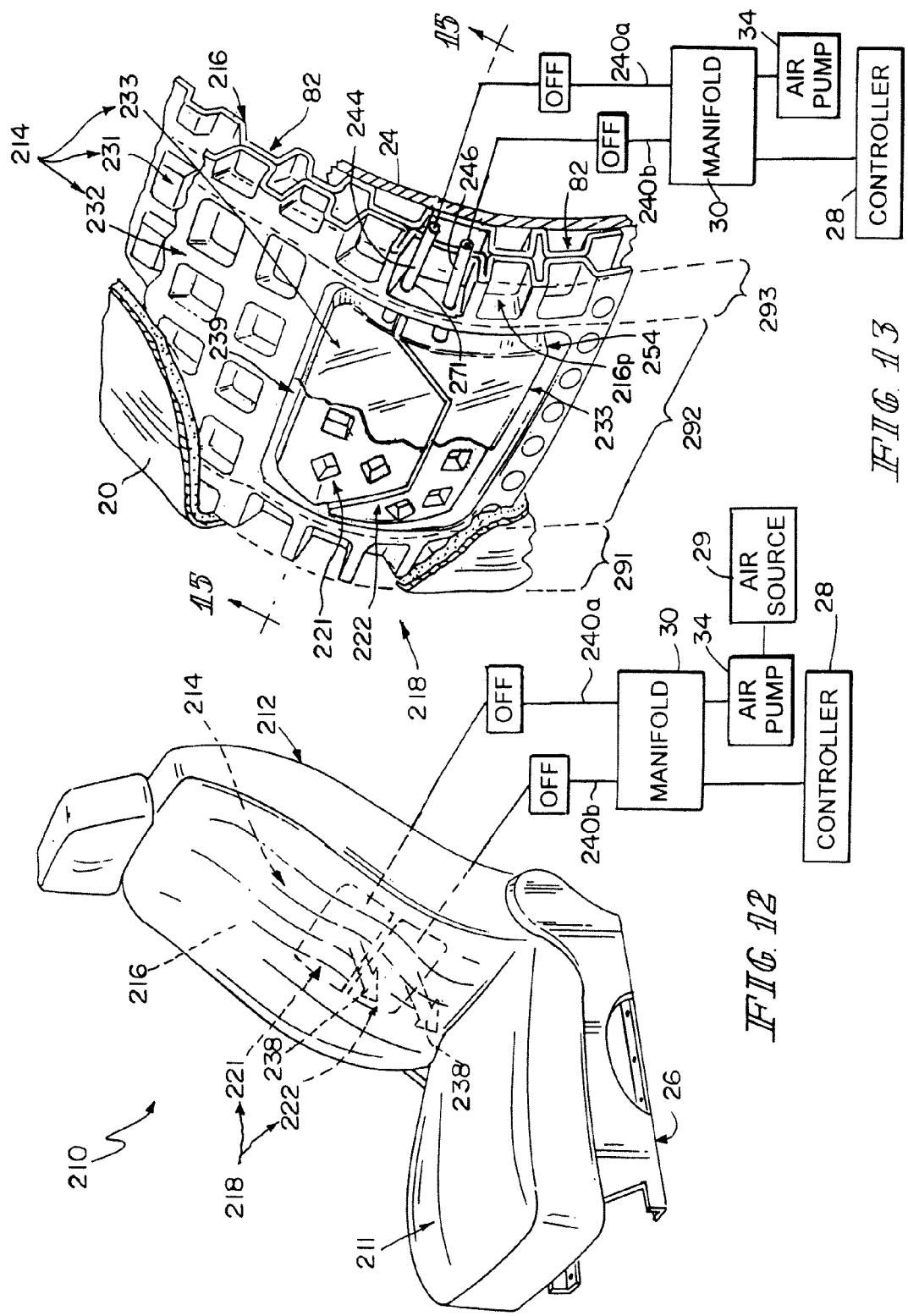

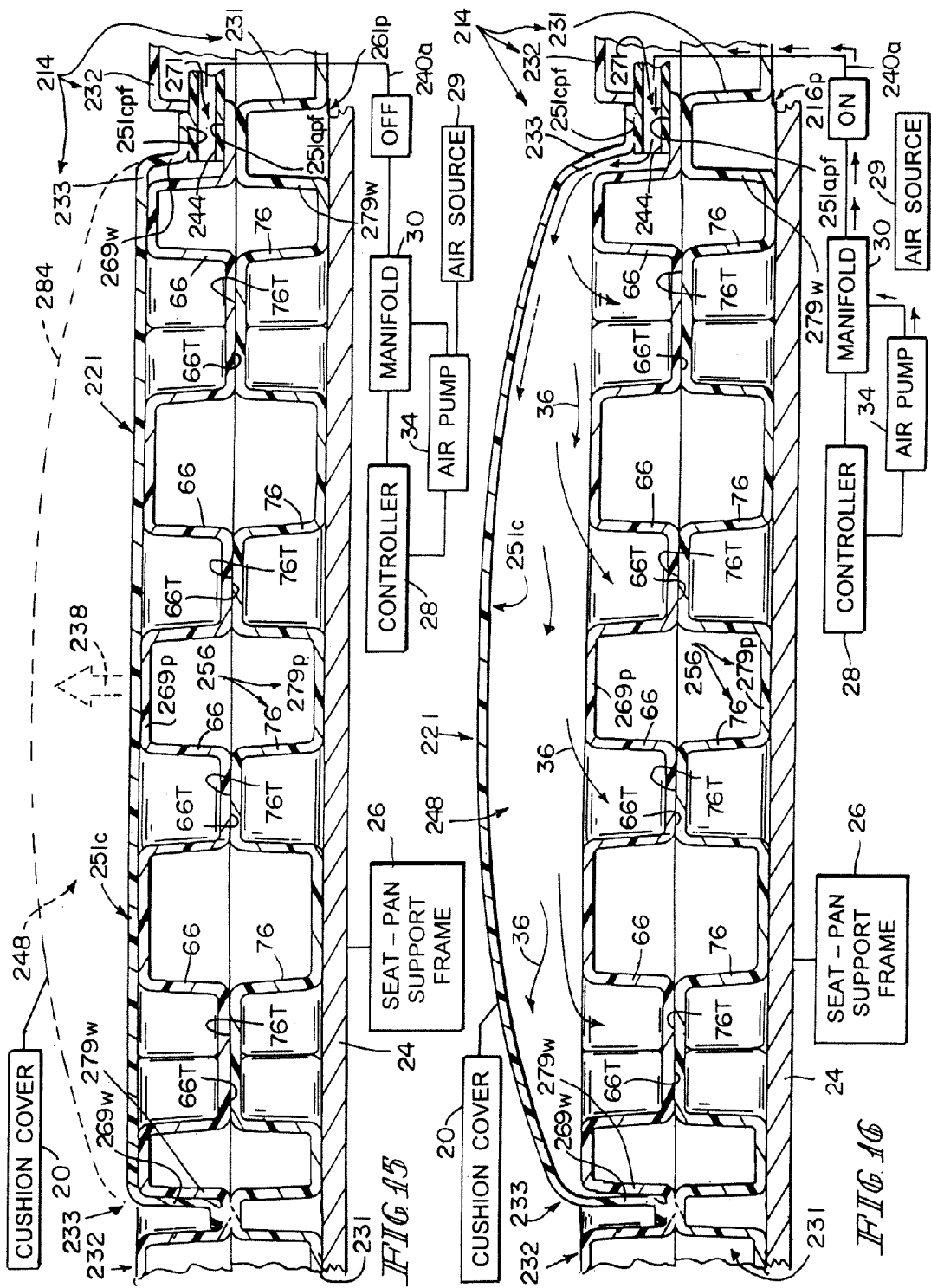

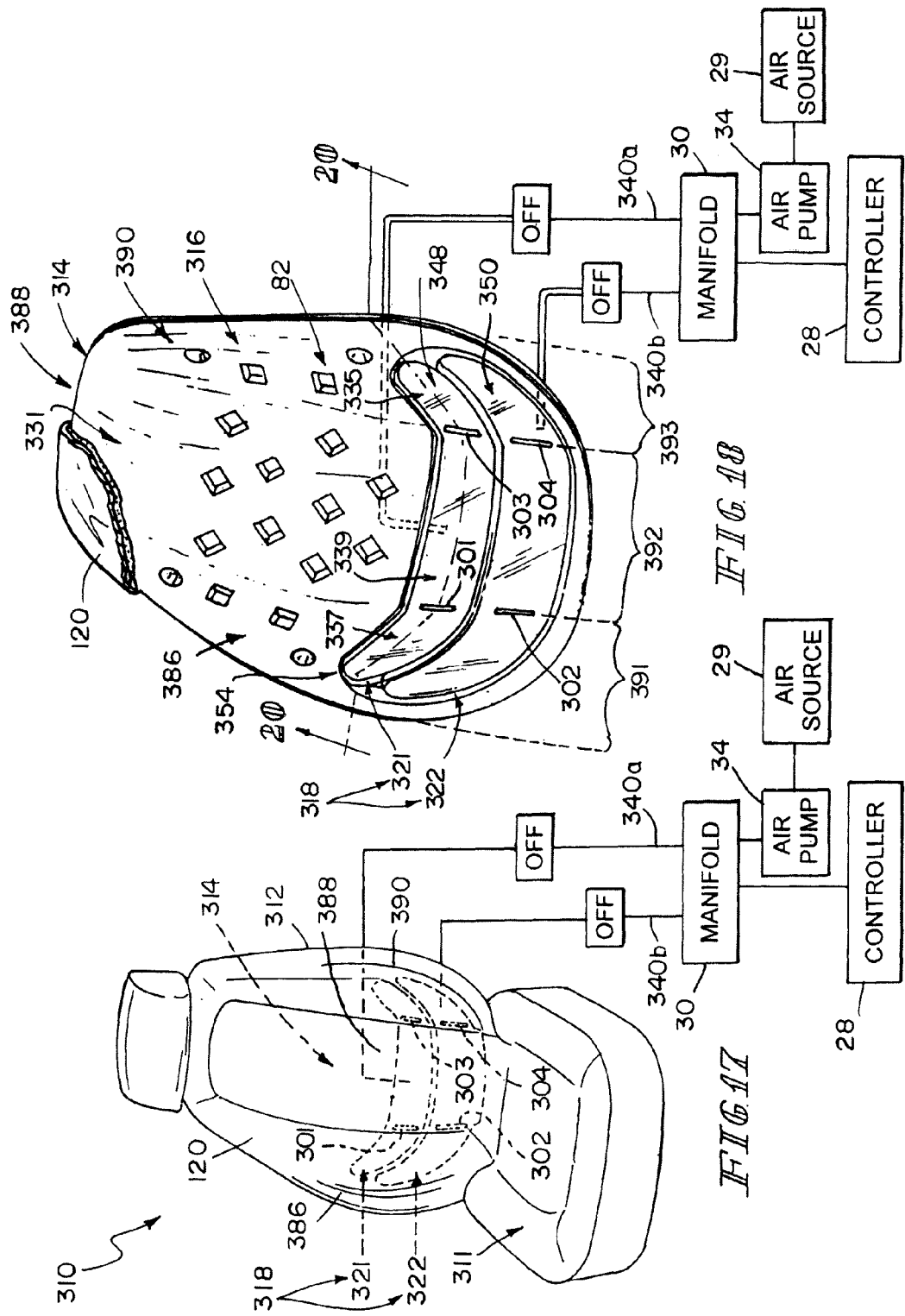

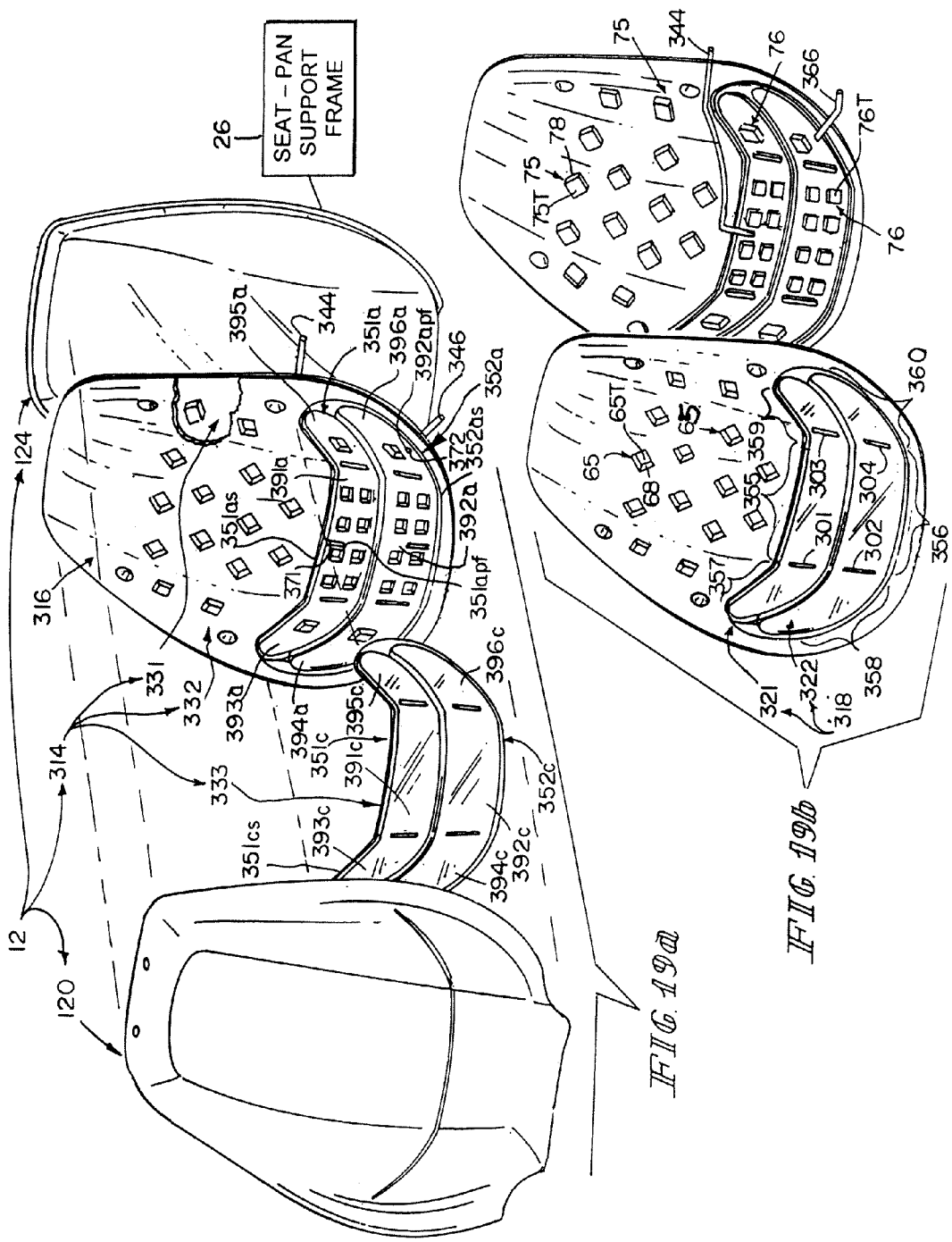

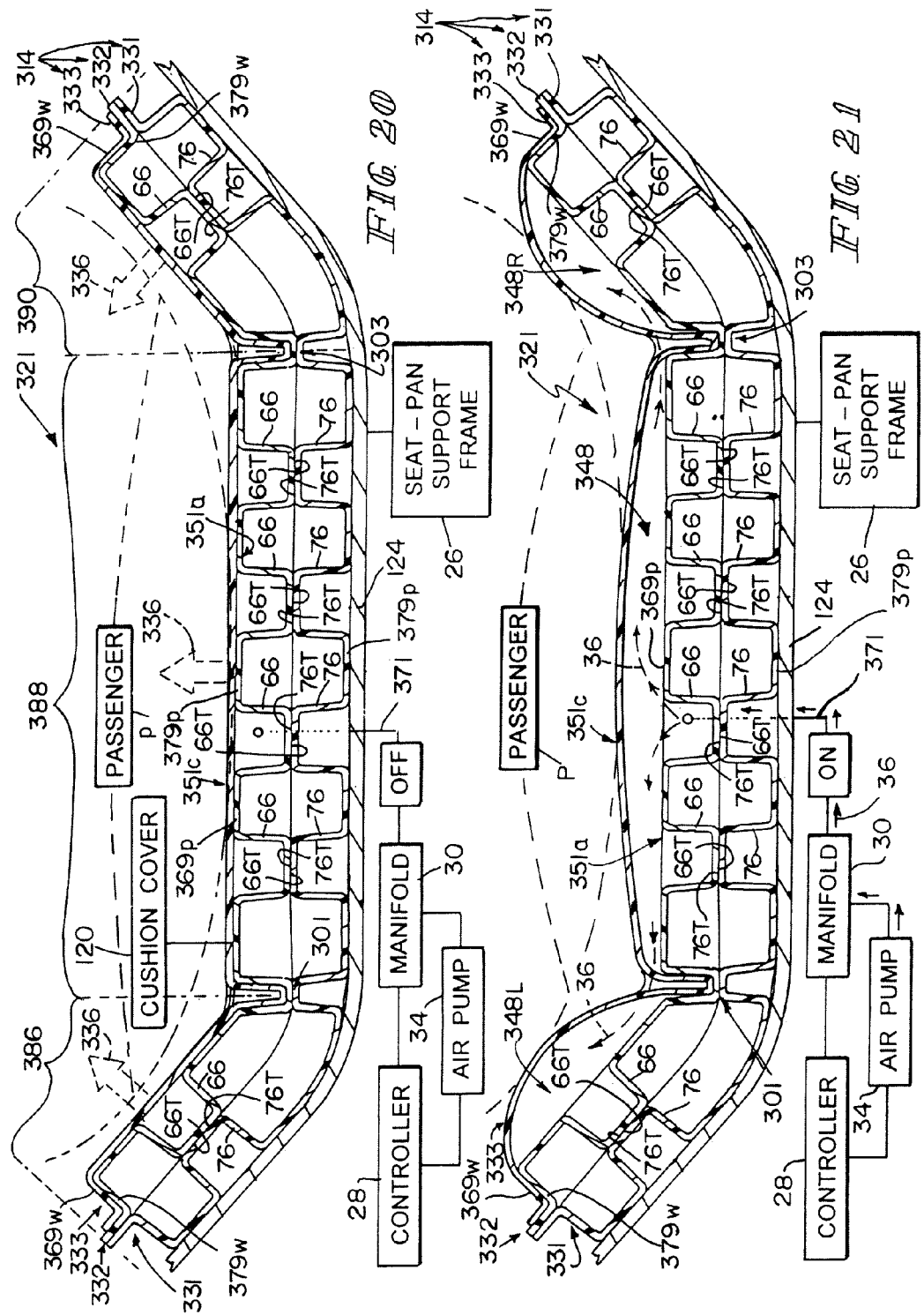

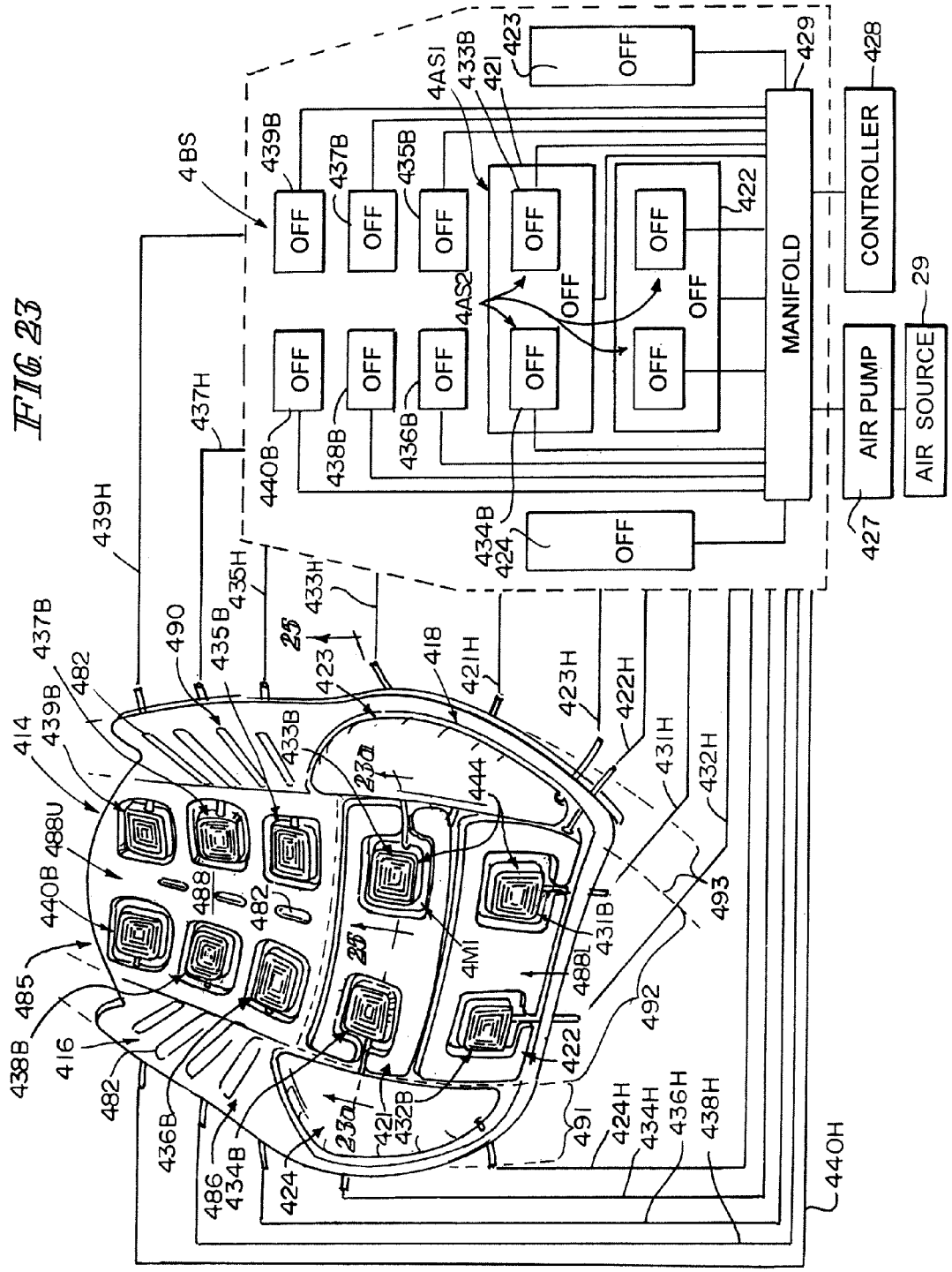

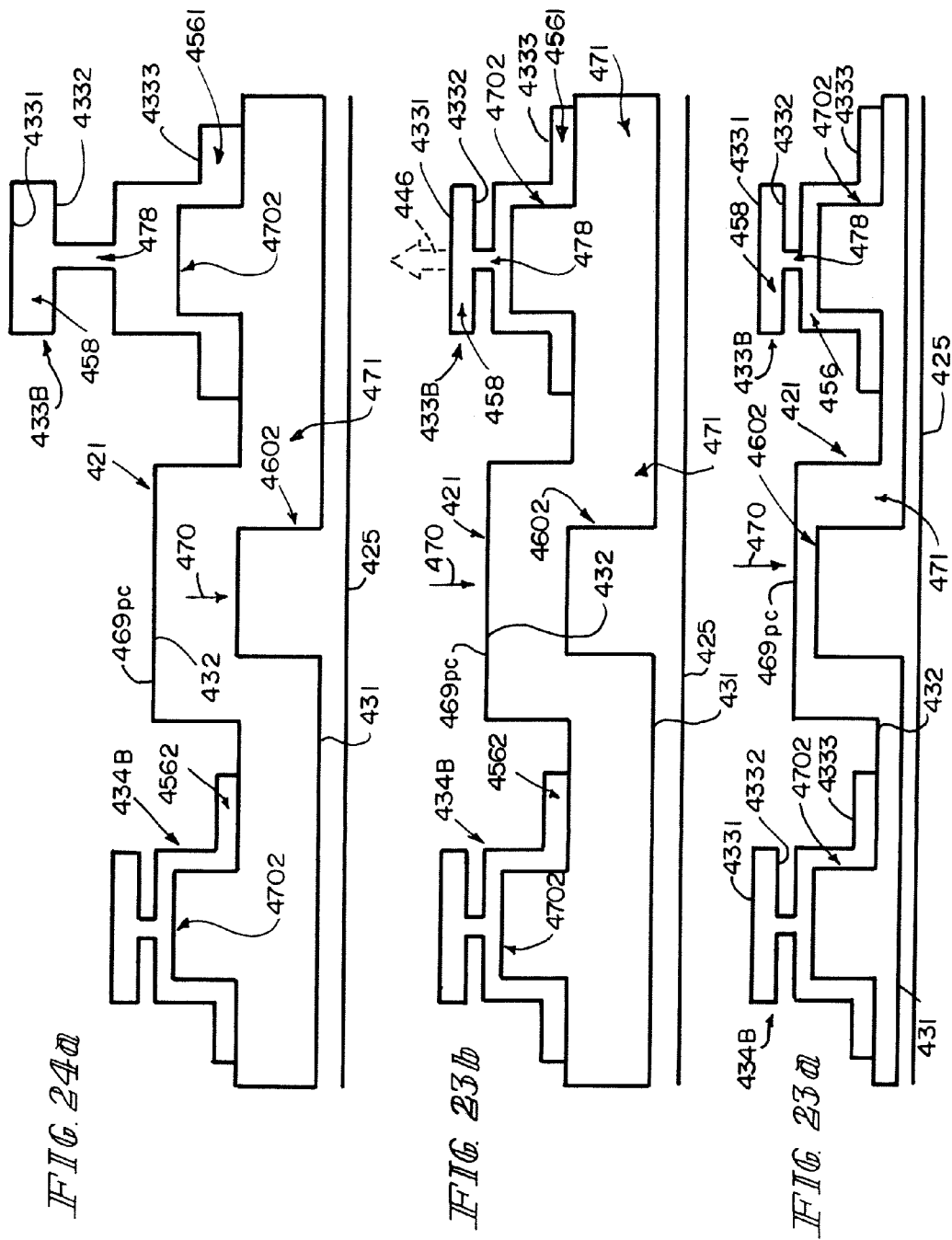

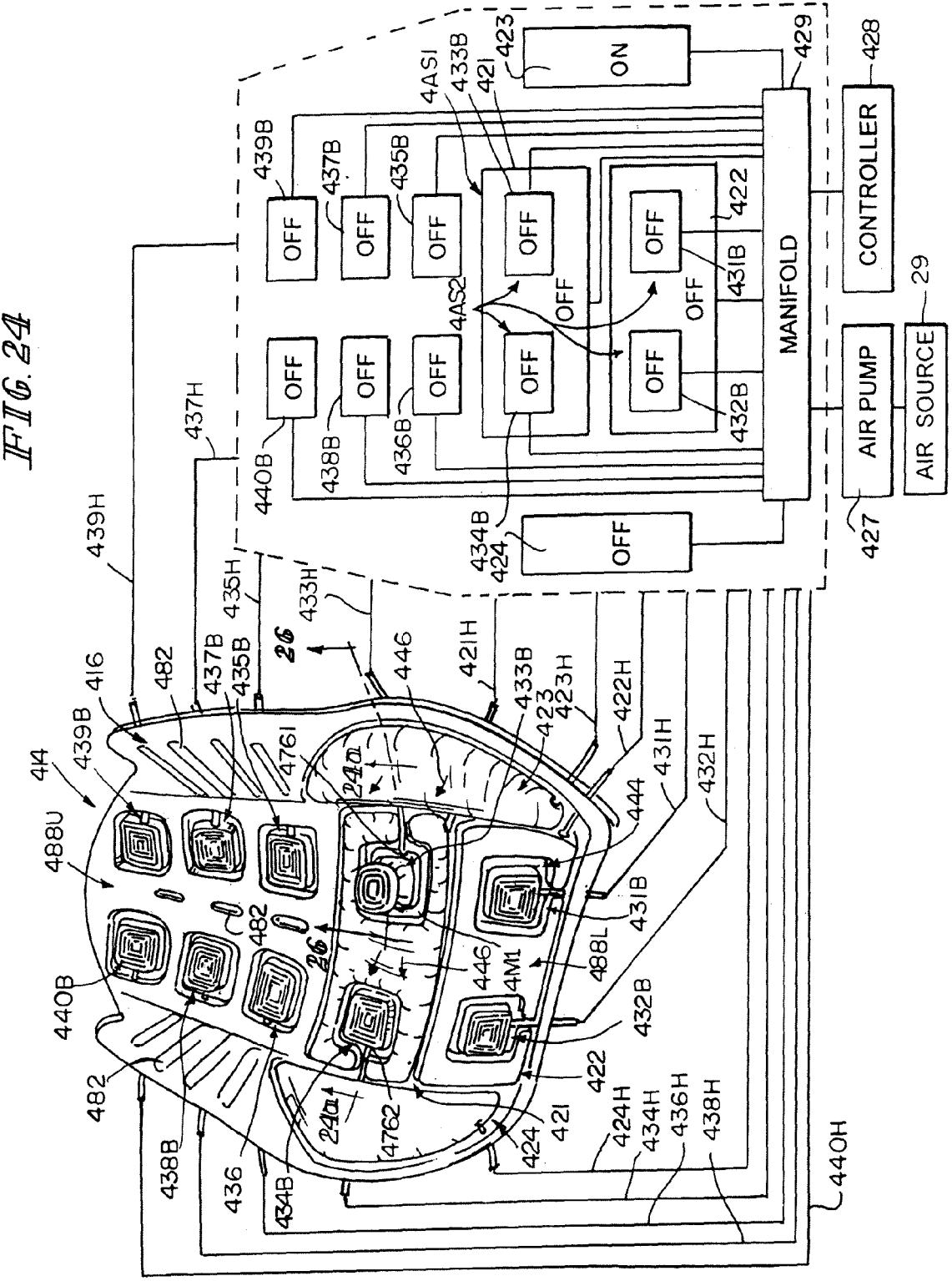

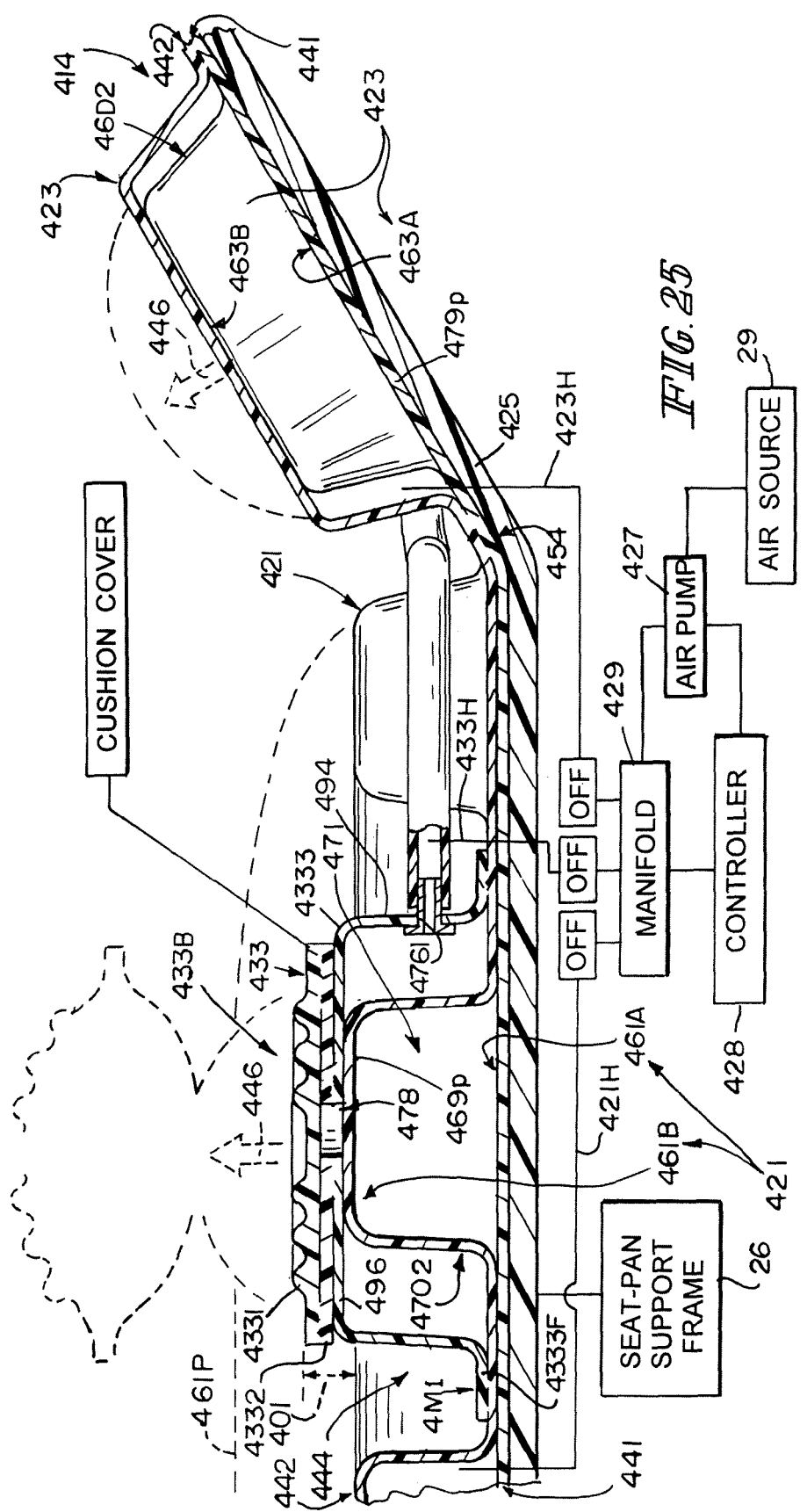

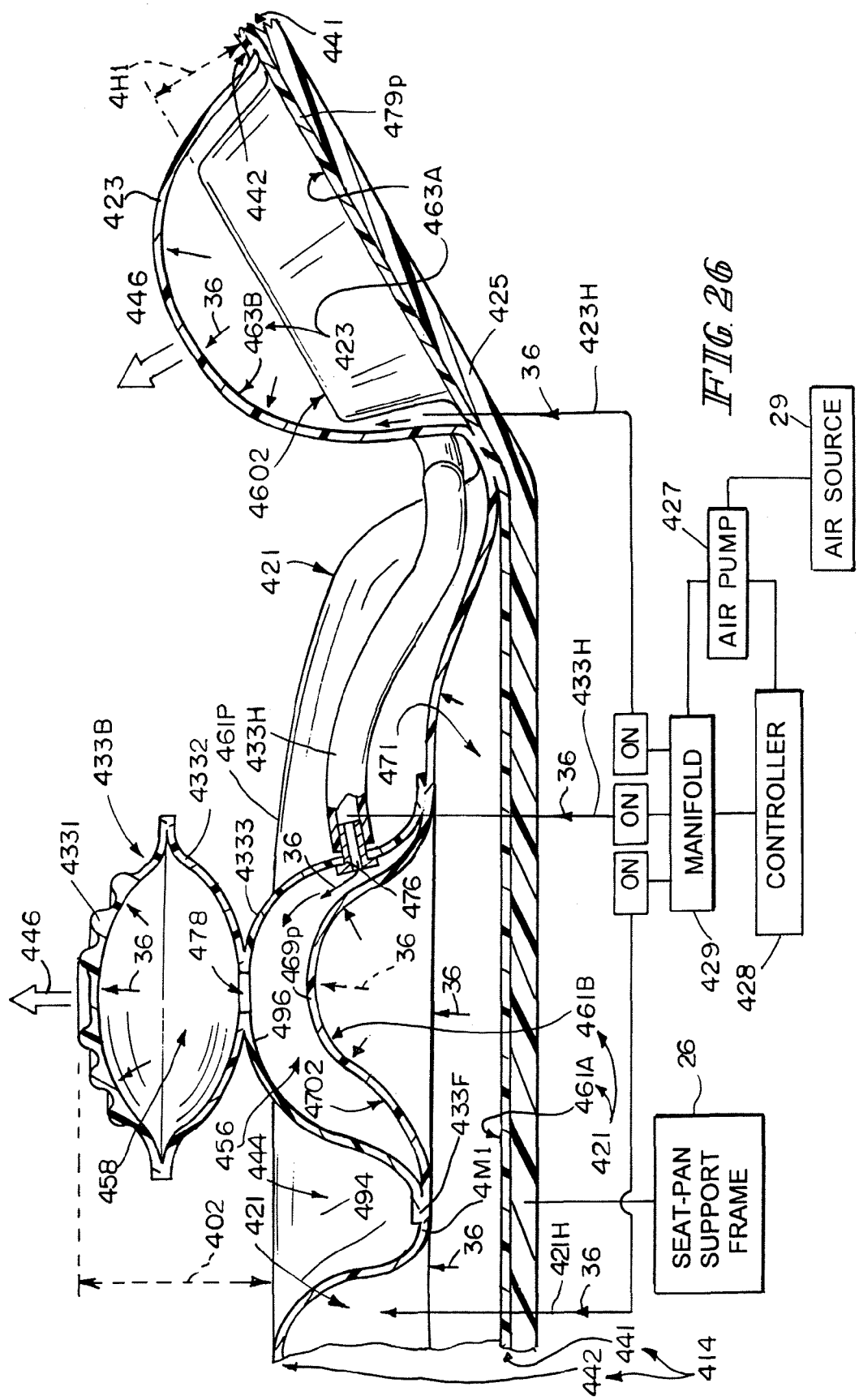

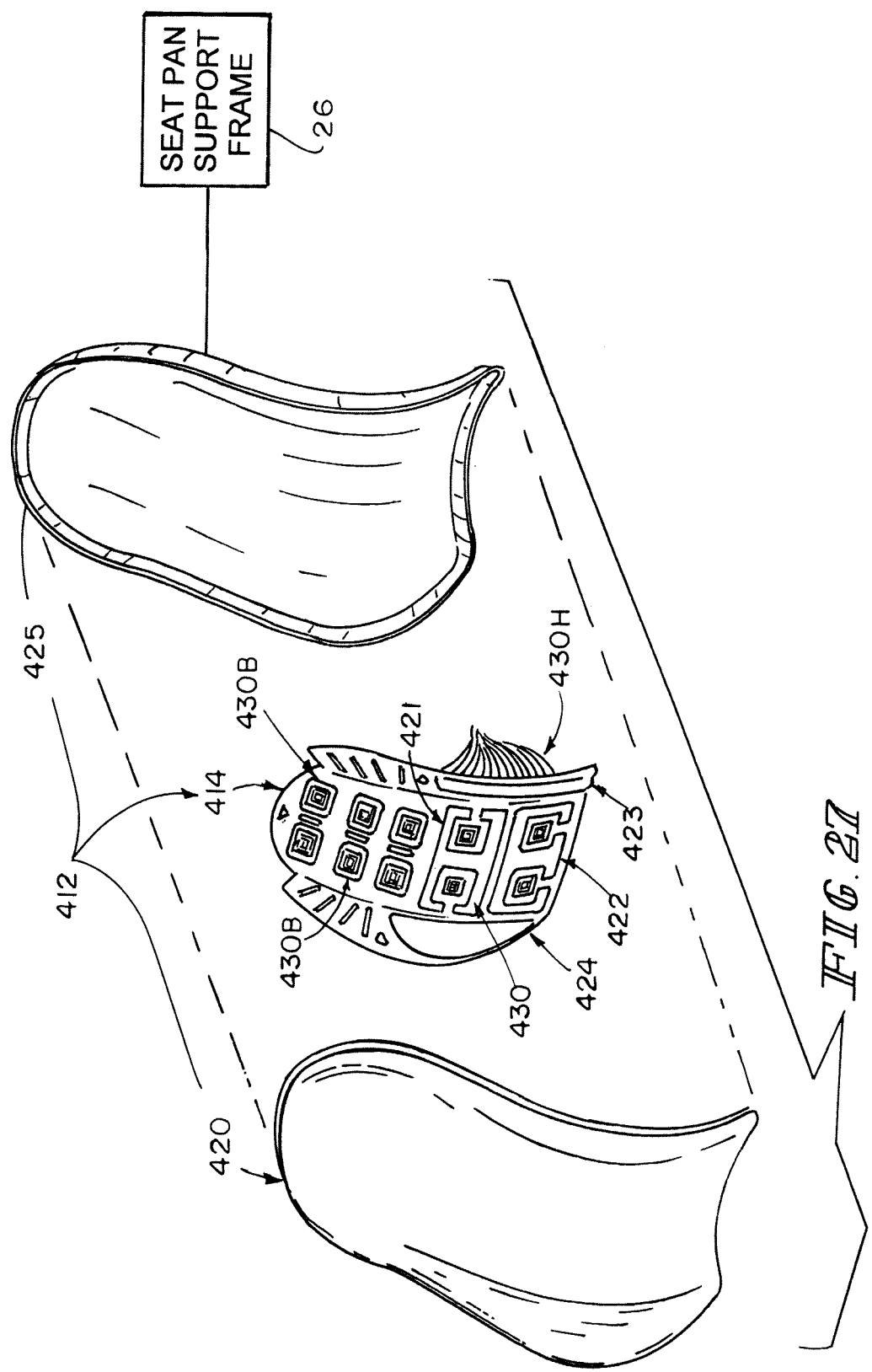

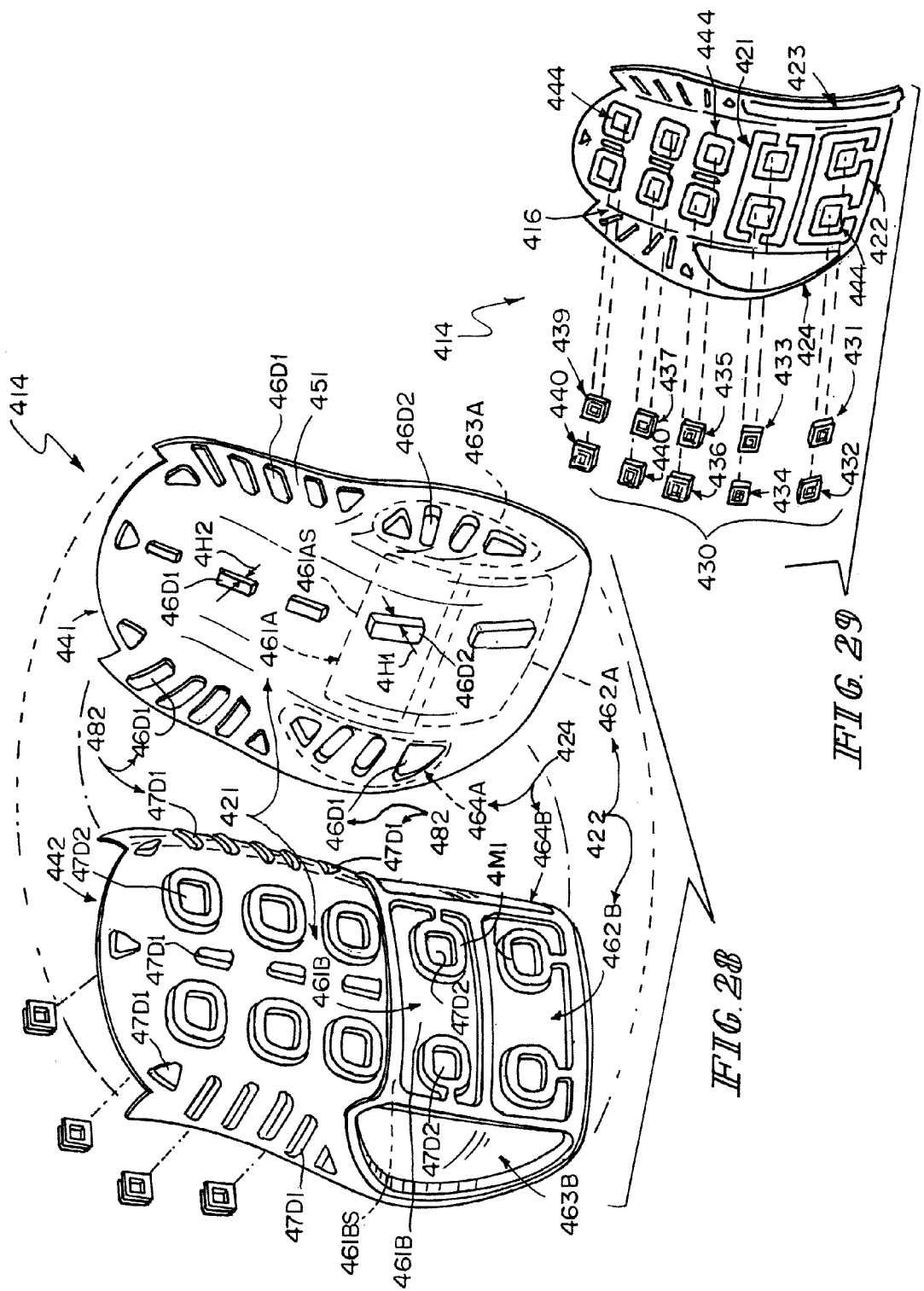

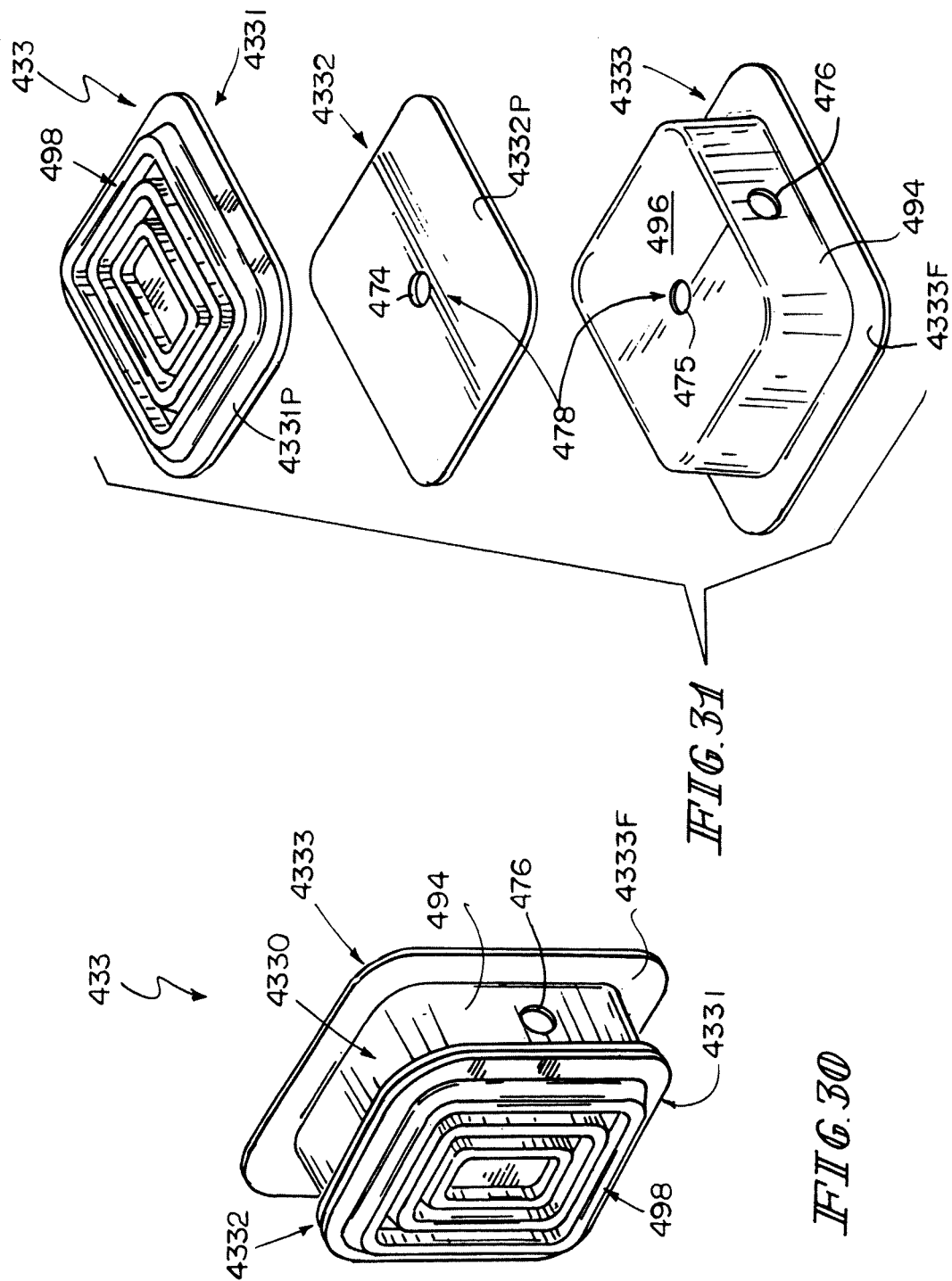

VEHICLE SEAT CUSHION WITH INFLATABLE SUPPORT

CROSS REFERENCE TO RELATED APPLICATIONS

This application is a U.S. national counterpart application of international application serial No. PCT/US2010/057048 filed Nov. 17, 2010, which claims priority to U.S. Provisional Patent Application No. 61/266,044 filed Dec. 2, 2009. The entire disclosures of PCT/US2010/057048 and U.S. Ser. No. 61/266,044 are hereby incorporated by reference.

BACKGROUND

The present disclosure relates to a vehicle seat, and particularly to a seat including an expandable and contractable portion. More particularly, the present disclosure relates to a vehicle seat including a cushion having a variable shape.

SUMMARY

According to the present disclosure, a vehicle seat includes a seat back. The seat back includes a cushion comprising an inflatable air bladder. In illustrative embodiments, the vehicle seat also includes a seat bottom and the seat back that extends upwardly from the seat bottom and includes a frame behind the cushion.

In illustrative embodiments, the cushion includes a deformable elastic bed made of an elastomeric material. The cushion also includes one or more inflatable air bladders made of the elastomeric material and coupled to the deformable elastic bed.

In illustrative embodiments, the cushion comprises two monolithic sheets that are mated to form the deformable elastic bed and a pair of inflatable air bladders. In one embodiment, the inflatable air bladders reside only in a backrest included in the cushion. In another embodiment, the inflatable air bladders lie in the backrest and extend outwardly into both of the angled left and right wings included in the cushion and arranged to flank the backrest.

In illustrative embodiments, the cushion comprises three monolithic sheets. The first and second sheets mate to form the deformable elastic bed. The second and third sheets mate to form a pair of inflatable air bladders. In one embodiment, the inflatable air bladders reside only in a backrest included in the cushion. In another embodiment, the inflatable air bladders lie in the backrest and extend outwardly into both of the angled left and right wings included in the cushion and arranged to flank the backrest.

In illustrative embodiments, the cushion includes a deformable elastic bed and a bladder system coupled to the deformable elastic bed. The bladder system comprises an inflatable lumbar bladder located between two flanking inflatable bolster bladders. The bladder system also comprises one or more inflatable massage bladders associated with the inflatable lumbar bladder. In use, each of the lumbar bladder and bolster bladders can be inflated separately or in combination at the option of a passenger seated on the cushion to provide customized torso support. Also, each of the massage bladders associated with the inflatable lumbar bladder can be (1) inflated at the option of the passenger to provide further customized lumbar support or (2) inflated and deflated repeatedly in sequence and in accordance with a selected inflation/deflation cycling plan to provide a back-massaging sensation to a seated passenger.

In illustrative embodiments, the cushion comprises three monolithic sheets. A first monolithic sheet lies on an underlying seat pan and cooperates with an overlying second monolithic sheet to form the deformable elastic bed and each of the inflatable lumbar bladder and the inflatable bolster bladders. A massage unit lies above and cooperates with the second monolithic sheet to form an inflatable massage bladder having an air chamber that is separate from air chambers included in the inflatable lumbar and bolster bladders. In illustrative embodiments, several separate massage units are coupled to the second monolithic sheet to form an array of inflatable massage bladders on an exterior surface of the inflatable lumbar bladder.

In illustrative embodiments, the deformable elastic bed includes a central backrest bed section and the lumbar and massage bladders are located in a central bladder-receiving cavity formed in the central backrest bed section. The deformable elastic bed also includes left-wing and right-wing bed sections lying in spaced-apart diverging relation to one another to locate the central backrest bed section therebetween and to diverge in a direction extending away from the central backrest bed section. In illustrative embodiments, one of the bolster bladders is arranged to lie in a left bladder-receiving cavity formed in the left-wing bed section and another of the bolster bladders is arranged to lie in a right bladder-receiving cavity formed in the right-wing bed section.

Additional features of the present disclosure will become apparent to those skilled in the art upon consideration of illustrative embodiments exemplifying the best mode of carrying out the disclosure as presently perceived.

BRIEF DESCRIPTION OF THE DRAWINGS

The detailed description particularly refers to the accompanying figures in which:

FIG. 1 is a perspective and diagrammatic view of a vehicle seat including a seat bottom and a seat back comprising a cushion including a deformable elastic bed surrounding a pair of inflatable bladders (shown in phantom) that may be inflated by pressurized air coming from a manifold to expand the size of the inflatable air bladders relative to the deformable elastic bed as suggested in FIG. 6 so that a lower back (lumbar) area of a passenger seated in the vehicle seat is supported;

FIG. 2 is an enlarged partial perspective and diagrammatic view of the seat back of FIG. 1, with portions broken away, suggesting that use of an air pump and manifold to inflate each of the inflatable air bladders to provide a pneumatic four-way lumbar-support system in the cushion, with portions of the deformable elastic bed broken away to reveal a pair of air-inlet conduits coupled to associated air-inlet ports formed in a right-side edge of each inflatable air bladder;

FIG. 3 is an exploded perspective assembly view of the seat back of FIG. 1, showing that the seat back includes, from left to right, a cushion cover, a cushion including a multi-chambered deformable elastic bed formed to include a bladder-receiving cavity containing first and second inflatable air bladders, and a seat pan configured to couple to a seat-pan support frame and to mate with a pad comprising the cushion and the cushion cover;

FIG. 3a is an exploded perspective assembly view of the cushion of FIG. 3 showing that the cushion includes a monolithic first sheet, a monolithic second sheet in front of the monolithic first sheet, and a pair of air-inlet conduits that are arranged to be mounted between the monolithic first and second sheets to provide independent passageways for air to travel into the first and second inflatable air bladders formed in the cushion;

FIG. 4 is an enlarged exploded assembly view of the components included in the cushion shown in FIGS. 2-3a showing a monolithic first sheet made of an elastomeric material separated from a companion monolithic second sheet made of the elastomeric material before the two sheets are moved toward one another along the illustrated dotted lines to mate and join together to form the cushion shown in FIG. 3a;

FIG. 5 is a sectional and diagrammatic view taken along line 5-5 of FIG. 2 showing the first inflatable air bladder in the deflated state on a portion of the underlying seat pan and showing four separate resilient deformable posts formed in the first air chamber in response to mating engagement of each outwardly projecting dome included in an inner shell formed in the monolithic first sheet with a companion inwardly projecting dome included in an outer shell formed in the monolithic second sheet and showing (in phantom) an expansion perimeter defined by the monolithic second sheet after it has moved away from the monolithic first sheet as shown in FIG. 6;

FIG. 6 is a view similar to FIG. 5 showing the first inflatable air bladder in an inflated state and movement of inwardly projecting domes included in an outer shell formed in the monolithic second sheet away from companion outwardly projecting domes included in an inner shell formed in the monolithic first sheet;

FIG. 7 is a perspective and diagrammatic view of a vehicle seat in accordance with another embodiment of the present disclosure suggesting that a pair of inflatable air bladders formed in a cushion to extend from a left outer edge of a left wing of the cushion through a central backrest to a right outer edge of a right wing of the cushion may be inflated as suggested in FIG. 11;

FIG. 8 is an enlarged partial perspective and diagrammatic view of the seat back of FIG. 8, with portions broken away, suggesting that air provided by an air pump directed through a manifold may be communicated selectively into the first and second inflatable air bladders to provide a pneumatic four-way torso-support system in the cushion;

FIG. 9a is an exploded perspective assembly view of the seat back of FIG. 7, showing that the seat back includes, from left to right, a cushion cover, a cushion including a multi-chambered deformable elastic bed formed to include a bladder-receiving cavity containing first and second inflatable air bladders, and a seat pan configured to couple to a seat-pan support frame and to mate with a pad comprising the cushion and the cushion cover;

FIG. 9b is an exploded perspective assembly view of the cushion of FIG. 9a showing that the cushion includes a monolithic first sheet, a monolithic second sheet in front of the monolithic first sheet, and a pair of air-inlet conduits that are arranged to be mounted between the monolithic first and second sheets to provide independent passageways for air to travel into the first and second inflatable air bladders formed in the cushion;

FIG. 10 is a sectional and diagrammatic view taken along line 10-10 of FIG. 8 showing the first inflatable air bladder in a deflated state on the underlying seat pan and showing six separate resilient deformable posts formed in the first air chamber in response to mating engagement of each outwardly projecting dome included in an inner shell formed in the monolithic first sheet with a companion inwardly projecting dome included in an outer shell formed in the monolithic second sheet and showing (in phantom) a portion of a passenger's torso supported by the central backrest section of the first inflatable air bladder included in the cushion;

FIG. 11 is view similar to FIG. 10 showing the first inflatable air bladder in an inflated state and movement of inwardly projecting domes included in an outer shell formed in the monolithic second sheet away from companion outwardly projecting domes included in an inner shell formed in the monolithic first sheet and suggesting that the passenger's torso (shown in phantom) is supported by the central backrest section, the left-wing section, and the right-wing section of the of the first inflatable air bladder;

FIG. 12 is a perspective and diagrammatic view of a vehicle seat in accordance with another embodiment of the present disclosure showing that the vehicle seat includes a seat bottom and a seat back comprising a cushion including a deformable elastic bed surrounding a pair of inflatable bladders (shown in phantom) that may be inflated by pressurized air coming from a manifold to expand the size of the inflatable air bladders relative to the deformable elastic bed as suggested in FIG. 16 so that the lower back (lumbar) area of a person seated in the vehicle seat is supported;

FIG. 13 is an enlarged partial perspective and diagrammatic view of the seat back of FIG. 12, with portions broken away, suggesting use of an air pump and manifold to inflate each of the inflatable air bladders to provide a pneumatic four-way lumbar-support system in the cushion, with portions of an outer auxiliary layer of the cushion broken away to reveal diamond and square shaped resilient support structures are formed within the inflatable air bladders, and with portions of the deformable elastic bed broken away to reveal a pair of air-inlet conduits coupled to associated air-inlet ports formed in a right-side edges of each inflatable air bladder;

FIG. 15 is a sectional and diagrammatic view taken along line 15-15 of FIG. 13 showing the first inflatable air bladder in a deflated state and showing four separate resilient deformable posts formed in the first air chamber in response to mating engagement of each outwardly projecting dome included in an inner shell formed in the monolithic first sheet with a companion inwardly projecting dome included in an outer shell formed in the monolithic second sheet and showing (in phantom) an expansion perimeter defined by the auxiliary sheet moving outwardly away from the monolithic first and second sheets during inflation of the inflatable air bladder as suggested in FIG. 16;

FIG. 16 is a view similar to FIG. 15 showing the first inflatable air bladder in an inflated state and movement of inwardly projecting domes included in an outer shell formed in the monolithic second sheet away from companion outwardly projecting domes included in an inner shell formed in the monolithic first sheet and showing that the first inflatable air bladder is formed between the auxiliary sheet and the monolithic second sheet and that a series of spaced-apart resilient deformable posts are formed in the monolithic first and second sheets below the auxiliary sheet;

FIG. 17 is a perspective and diagrammatic view of a vehicle seat in accordance with another embodiment of the present disclosure suggesting that a pair of inflatable air bladders formed in a cushion to extend from a left outer edge of a left wing of the cushion through a central backrest to a right outer edge of a right wing of the cushion may be inflated as suggested in FIG. 21;

FIG. 18 is an enlarged partial perspective and diagrammatic view of the seat back of FIG. 17, with portions broken away, suggesting that air provided by an air pump directed through a manifold may be communicated selectively into the first and second inflatable air bladders to provide a pneumatic four-way torso-support system in the cushion;

FIG. 19a is an exploded perspective assembly view of the seat back of FIG. 17 showing that the seat back includes, from left to right, a cushion cover, a cushion including a multi-chambered deformable elastic bed and a pair of inflatable air bladders formed in the multi-chambered deformable elastic bed, and a seat pan coupled to a seat-pan support frame;

FIG. 19b is an exploded perspective assembly of the cushion of FIG. 19a showing that the cushion includes, from left to right, an auxiliary (third) sheet, a monolithic second sheet, a monolithic first sheet, and a pair of air-inlet conduits that are arranged to be mounted between the auxiliary sheet and the monolithic second sheet to provide independent passageways for air to travel into the first and second inflatable air bladders formed in the cushion;

FIG. 20 is a sectional and diagrammatic view taken along line 20-20 of FIG. 18 showing the first inflatable air bladder in a deflated state on the underlying seat pan showing six separate resilient deformable posts formed in the first air chamber in response to mating engagement of each outwardly projecting dome included in an inner shell formed in the monolithic first sheet with a companion inwardly projecting dome included in an outer shell formed in the monolithic second sheet and showing (in phantom) a portion of a passenger's torso supported by the central backrest section of the first inflatable air bladder;

FIG. 21 is a sectional view similar to FIG. 15 showing the first inflatable bladder in an inflated state and movement of inwardly projecting domes included in an outer shell formed in the monolithic second sheet away from companion outwardly projecting domes included in an inner shell formed in the monolithic first sheet and showing that the first inflatable bladder is formed between the auxiliary sheet and the monolithic second sheet so that the passenger's torso is supported by the central backrest section, the left-wing section, and the right-wing section of the first inflatable air bladder;

FIG. 23 is an enlarged partial perspective and diagrammatic view of the cushion of FIG. 22 showing the cushion in a deflated state and suggesting that an air pump and manifold may be used to inflate each of the inflatable air bladders so that a pneumatic back-support system is provided in the cushion;

FIG. 23a is a diagrammatic sectional view taken along line 23a-23a of FIG. 23 while each of the first and second air bladders is in a deflated state;

FIG. 23b is a diagrammatic sectional view similar to FIG. 23a showing the first air bladder in an inflated state while the second air bladder remains in a deflated state;

FIG. 24 is a view similar to FIG. 23 showing the cushion after pressurized air has been admitted into a right bolster bladder, a top lumbar bladder, and a massage bladder coupled to a right side of the top lumbar bladder;

FIG. 24a is a diagrammatic sectional view taken along lines 24a-24a of FIG. 24 while each of the first and second air bladders is in an inflated state;

FIG. 25 is a sectional view taken along line 25-25 of FIG. 23 showing that a free-standing dome is arranged in the right bolster bladder and in the massage bladder to provide support to the passenger resting against the cushion when the bladders are deflated and showing (in phantom) an expansion perimeter defined by the inflatable bladders;

FIG. 26 is a sectional and diagrammatic view taken along line 26-26 of FIG. 24 showing the right bolster bladder in an inflated state, the top lumbar bladder in an inflated state, and the massage bladder in an inflated state;

FIG. 27 is an exploded perspective assembly view of the seat back of FIG. 22 showing that the seat back includes, from left to right, a cushion cover, a cushion including a deformable elastic bed formed to include multiple massage-bladder cavities that contain ten square-shaped massage bladders, two spaced-apart bolster bladders, and two rectangle-shaped lumbar bladders, and a seat pan configured to couple to a seat-pan support frame and to mate with a pad that comprises the cushion and the cushion cover;

FIG. 28 is an exploded perspective assembly view of the cushion of FIG. 23 showing that the cushion includes, from left to right, a set of massage bladders, a monolithic second sheet on which the massage bladders are coupled thereto, and a monolithic first sheet that is coupled to the monolithic second sheet to form the pair of bolster bladders and the pair of lumbar bladders therebetween;

FIG. 29 is an exploded perspective assembly view of the cushion of FIG. 23 suggesting that the set of ten massage bladders are arranged to lie in associated massage-bladder cavities formed in the monolithic second sheet and that the massage bladders are coupled to an outer surface of the monolithic second sheet;

FIG. 30 is an enlarged perspective view of one massage bladder included in the set of massage bladder shown in FIG. 29; and FIG. 31 is an exploded perspective assembly view of the massage bladder of FIG. 30 showing that the massage bladder includes, from top to bottom, a first expansion layer, a second expansion layer formed to include an air passageway, and a dome-shaped third expansion layer configured to mate with the outer surface of the monolithic second sheet as suggested in FIG. 29.

DETAILED DESCRIPTION

Figure 4:
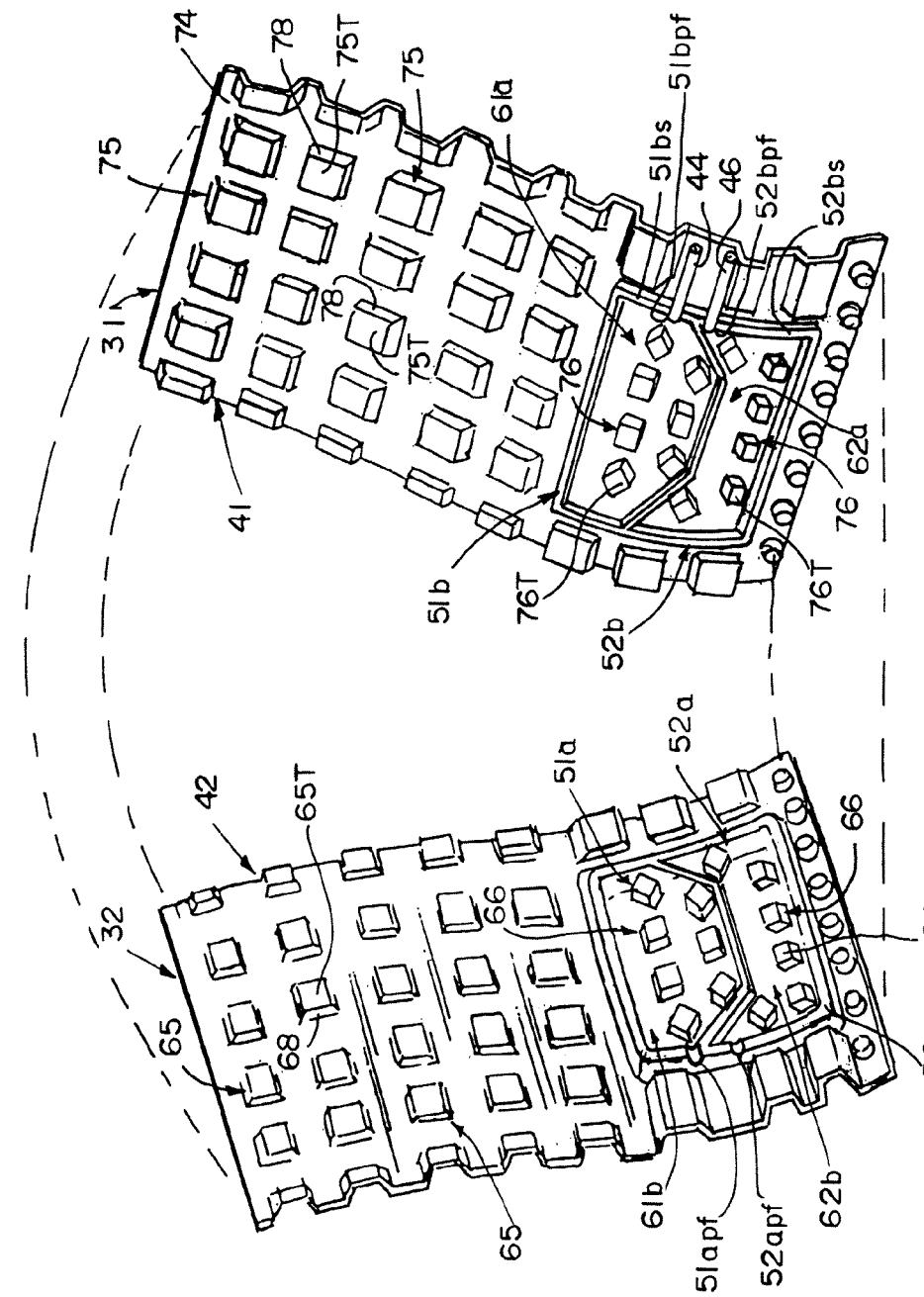

A vehicle seat includes a seat bottom and a seat back arranged to extend upwardly from the seat bottom as shown, for example, in FIGS. 1, 7, 12, 17, and 22. In each of the embodiments disclosed herein, the seat back includes a cushion comprising an inflatable air bladder. In the embodiments illustrated in FIGS. 1-11, two monolithic sheets made of an elastomeric material cooperate to form the cushion. In the embodiments illustrated in FIGS. 12-21, three monolithic sheets made of an elastomeric material cooperate to form the cushion. In the embodiment illustrated in FIGS. 22-31, two monolithic sheets and several massage bladders made of elastomeric material cooperate to form the cushion.

In the embodiments shown in FIGS. 1-11, two monolithic sheets cooperate to form a cushion having a backrest flanked by left and right side wings. In one embodiment shown in FIGS. 1-6, a pair of inflatable air bladders 21, 22 are located only in a backrest 88 included in cushion 14 and flanked by left and right side wings 86, 90. In another embodiment shown in FIGS. 7-11, a pair of inflatable air bladders 121, 122 are located in left side wing 186, backrest 188, and right side wing 190 included in cushion 114.

In the embodiments shown in FIGS. 12-21, three monolithic sheets cooperate to form a cushion having a backrest flanked by left and right side wings. In one embodiment shown in FIGS. 12-16, a pair of inflatable air bladders 221, 222 are located only in a backrest 288 included in cushion 214 and flanked by left and right side wings 286, 290. In another embodiment shown in FIGS. 17-21, a pair of inflatable air bladders 321, 322 are located in left side wing 386, backrest 388, and right side wing 390 included in cushion 314.

In the embodiments shown in FIGS. 22-31, two monolithic sheets cooperate to form a cushion having a backrest flanked by left and right side wings. As shown in FIGS. 23, 24, and 27-29, a pair of rectangle-shaped inflatable lumbar bladders and 421, 422 several inflatable massager bladders 430B are located only in a backrest 488 included in cushion 414. Backrest 488 is flanked by a left and right side wings 486, 490 and a half-moon shaped inflatable bolster bladder 423, 424 is located in each side wing 486, 490.

A vehicle seat 10, in accordance with the present disclosure, includes one occupant-support base 11 configured to provide a seat bottom and another occupant-support base 12 configured to provide a seat back arranged to extend upwardly from the seat bottom as shown in FIG. 1. In an illustrative embodiment, seat back 12 includes a cushion 14 including a deformable elastic bed 16 and a pair of inflatable air bladders 21, 22 as suggested in FIGS. 3-4. Deformable elastic bed 16 is configured to support a portion of a passenger seated on cushion 14 of seat back 12. Inflatable air bladders 21, 22 may be inflated using pressurized air to expand in outward directions 38 from a deflated state shown in FIGS. 1, 2, and 5 to an inflated state shown in FIG. 6 to provide adjustable lumbar support for a passenger seated in vehicle seat 10. Inflatable air bladders 21, 22 cooperate to form an adjustable pneumatic passenger-support module 18 as suggested in FIGS. 1 and 2.

Deformable elastic bed 16 and inflatable air bladders 21, 22 are made from a suitable elastomeric material in an illustrative embodiment. Deformable elastic bed 16 and inflatable air bladders 21, 22 are made of the same elastomeric material in an illustrative embodiment. In illustrative embodiments, an elastomeric material such as a thermoplastics polyurethane (TPU) material is used.

Seat back 12 includes a cushion cover 20, a cushion 14, and a seat pan 24 as shown, for example, in FIGS. 2 and 3. A seat-pan support frame 26 may also be included in vehicle seat 10 to support a seat pan 24 included in seat back 12 or seat bottom 11 as suggested in FIGS. 1 and 3. Cushion 14 is anchored to underlying seat pan 24 using any suitable means and cushion cover 20 is coupled to cushion 14 and/or seat pan 24 using any suitable means and arranged to cover deformable elastic bed 16 and inflatable air bladders 21, 22 as suggested in FIGS. 1-3. It is within the scope of this disclosure to support cushion 14 using a conventional frame having suspension springs.

During use of adjustable pneumatic passenger-support module 18, a pump controller 28 is used by a passenger to actuate a manifold 30 to direct a source of pressurized air, such as an air pump 34 coupled to an air source 29, to generate a pressurized air stream 36. Pressurized air steam 36 is conducted through a pair of hoses 40a, 40b and then through a pair of associated air-inlet conduits 44, 46 into air chambers 48, 50 formed in inflatable air bladders 21, 22 as suggested in FIGS. 1, 2, and 5. This causes inflatable air bladders 21, 22 to expand outwardly in outward direction 38 to assume an inflated state as suggested in FIG. 6. It is within the scope of the present disclosure to use any suitable fluid pressure management system to inflate and deflate inflatable air bladders 21, 22.

Cushion 14 illustratively includes a left wing 86, a backrest 88, and a right wing 90 as shown, for example, in FIGS. 1 and 2. Backrest 88 is configured to support a central portion of a passenger's torso. Left wing 86 is configured to support a left portion of the passenger's torso and right wing 90 is configured to support a right portion of the passenger's torso. As shown in FIG. 2, first and second inflatable air bladders 21, 22 are arranged to lie in backrest 88 of cushion 14.

Deformable elastic bed 16 is formed to include a left-wing bed section 91, a backrest bed section 92, and a right-wing bed section 93. As shown in FIG. 2, left-wing bed section 91 is arranged to lie in spaced-apart relation to right-wing bed section 93 to locate backrest bed section 92 therebetween. Illustratively, first and second inflatable air bladders 21, 22 are positioned to lie in backrest bed section 92 of deformable elastic bed 16.

As shown in FIG. 3, a top portion 911, an intermediate portion 912, and a bottom portion 913 cooperate to form left-wing bed section 91. Intermediate portion 912 is arranged to interconnect top portion 911 and bottom portion 913. A top portion 931, an intermediate portion 932, and a bottom portion 933 cooperate to form right-wing bed section 93.

A top portion 921, an intermediate portion 922, and a bottom portion 923 cooperate to form backrest bed section 92 as illustrated in FIG. 3. Intermediate portion 912 of backrest bed section 92 is arranged to interconnect top portion 921 and bottom portion 923. As suggested in FIG. 3, first and second inflatable air bladders 21, 22 are positioned to lie above intermediate portion 922 of backrest bed section 92 between top portion 921 and bottom portion 923.

A monolithic first sheet 31 and a monolithic second sheet 32 are mated together to form deformable elastic bed 16 and first and second inflatable air bladders 21, 22 as suggested in FIGS. 3a and 4. Each of monolithic first and second sheets 31, 32 is made of an elastomeric material.

Monolithic first sheet 31 includes a first web 41, a first inner shell 51b, and a second inner shell 52b as shown in FIG. 4. First web 41 is configured to form an inner portion of deformable elastic bed 16. First inner shell 51b is configured to form an inner portion of first inflatable air bladder 21. Second inner shell 52b is configured to form an inner portion of second inflatable air bladder 22.

Monolithic second sheet 32 includes a second web 42, a first outer shell 51a, and a second outer shell 52a as illustrated in FIG. 4. Second web 42 is configured to form an outer portion of deformable elastic bed 16. First outer shell 51a is configured to form an outer portion of first inflatable air bladder 21. Second outer shell 52a is configured to form an outer portion of second inflatable air bladder 22.

First inflatable air bladder 21 is formed to include first air chamber 48 by mating portions of monolithic first and second sheets 31, 32 as suggested in FIGS. 5 and 6. As shown, for example, in FIG. 4, first inner shell 51b of first monolithic sheet 31 includes a shell wall 79w and a shell plate 79p as shown in FIGS. 5 and 6. Shell wall 79w and shell plate 79p cooperate to form a first basin 61a and first outer shell 51a of second monolithic sheet 32 includes a shell wall 69w and a shell plate 69p. Shell wall 69w and shell plate 69p cooperate to form a first basin 61b opening toward first basin 61a. First shells 51a, 51b are sealingly coupled to one another to cause first basins 61a, 61b to communicate with one another to form first air chamber 48 between first shells 51a, 51b as suggested in FIGS. 4-6.

Second air chamber 50 of second inflatable air bladder 22 is suggested in FIG. 2 and is formed in a manner similar to first air chamber 48 of first inflatable air bladder 21. Second inner shell 52b of first web 41 is formed to include a second basin 62a and second outer shell 52a of second web 42 is formed to include a second basin 62b opening toward second basin 62a. Second shells 52a, 52b are sealingly coupled to one another to cause second basin 62a, 62b to communicate with one another to form second air chamber 50 between second shells 52a, 52b as suggested in FIGS. 2 and 4.

First inflatable air bladder 21 is also formed to include a first air-intake port 71 opening into first air chamber 48 and mating with first air-inlet conduit 44 as suggested in FIGS. 2, 3a, and 4-6. First shells 51a, 51b mate with one another along a first shell interface 54 and cooperate to form first air-intake port 71 therebetween along first shell interface 54 as shown, for example, in FIGS. 2, 5, and 6. First inner shell 51b of first web 41 includes a continuous sealing edge 51bs that is interrupted by a port-forming edge 51bpf as shown in FIG. 4. Similarly, first outer shell 51a of second web 42 includes a continuous sealing edge 51as interrupted by a port-forming edge 51apf as shown in FIG. 4. When monolithic first sheet 31 is mated to monolithic second sheet 32, sealing edge 51bs of first inner shell 51b is sealingly coupled to sealing edge 51as of first outer shell 51a to form first air chamber 48 and port-forming edge 51apf of first outer shell 51a is arranged to lie in stationary confronting relation to port-forming edge 51bpf of first inner shell 51b to form first air-intake port 71 therebetween as suggested in FIGS. 3a-6.

As shown in FIG. 5, first inflatable air bladder 21 is shown in a deflated state with pressurized air stream 36 from manifold 30 being turned OFF. A series of outwardly projecting domes 76 are formed in first inner shell 51b of monolithic first sheet 31 as shown best in FIGS. 4-6. A series of inwardly projecting domes 66 are formed in first outer shell 51a of monolithic second sheet 32 as shown best in FIGS. 4-6. Domes 66 and 76 may be formed to have any suitable shape and frustopyramidal shapes are shown as an example.

When first inflatable air bladder 21 is in the deflated stated, a first tip 76T of dome 76 and a second tip 66T of dome 66 are arranged to lie in confronting relation to one another as shown in FIG. 5. First tip 66T is aligned above second tip 76T so that first tip 66T is supported by second tip 76T to cause a passenger resting on cushion 14 to be supported by the deflated inflatable air bladder 21. When first inflatable air bladder 21 is inflated, monolithic second sheet 32 is permitted to move away from monolithic first sheet 31 toward an expansion perimeter 84 to cause first tip 66T of each dome 66 to separate and move away from a companion second tip 76T of dome 76 as suggested in FIG. 5 and shown in FIG. 6.

Pressurized air stream 36 is communicated into first inflatable air bladder 21 through first air-inlet conduit 44. As an example, first air-inlet conduit 44 is arranged to extend into first air-intake port 71 and formed to include a passageway configured to provide means for conducting pressurized air from a source 34 into first air chamber 48 to change first inflatable air bladder 21 from the deflated state shown in FIGS. 1, 2, and 5 to the inflated state shown in FIG. 6. In an illustrative embodiment, first air-inlet conduit 44 is arranged to extend away from first inflatable air bladder 21 through a portion 16p of deformable elastic bed 16 as suggested in FIGS. 2, 5, and 6.

Second inflatable air bladder 22 is also formed to include a second air-intake port 72 opening into second air chamber 50 and mating with second air-inlet conduit 46 as suggested in FIGS. 2, 3a, and 4. Second shells 52a, 52b mate with one another along a second shell interface 53 and cooperate to form second air-intake port 72 therebetween as suggested in FIG. 2. Second outer shell 52a of monolithic second sheet 32 includes a continuous sealing edge 52as interrupted by a port-forming edge 52apf as shown in FIG. 4. Similarly, second inner shell 52b of monolithic first sheet 31 includes a continuous sealing edge 52bs interrupted by a port-forming edge 52bpf as shown in FIG. 4. When monolithic first sheet 31 is mated to monolithic second sheet 32, sealing edge 52bs of second inner shell 52b is sealingly coupled to sealing edge 52as of second outer shell 52a to form second air chamber 50 and port-forming edge 52apf of second outer shell 52a is arranged to lie in stationary confronting relation to port-forming edge 52bpf of second inner shell 52b to form second air-intake port 72 therebetween as suggested in FIGS. 3a, 3b, and 4.

Second air-inlet conduit 46 is arranged to extend into second air-intake port 72 and is formed to include a passageway configured to provide means for conducting pressurized air from a source 34 into second air chamber 50 to change the second inflatable air bladder 22 from a deflated state to an inflated state. In an illustrative embodiment, second air-inlet conduit 46 is arranged to extend away from second inflatable air bladder 22 and through a portion 16p of deformable elastic bed 16 parallel to first air-inlet conduit 44.

First web 41 of monolithic first sheet 31 includes a first plate 74 and an array of spaced-apart outwardly projecting domes 75 coupled to first plate 74 as shown best in FIG. 4. In an illustrative embodiment, each dome 75 included in first web 41 is larger than the domes 76 included in first and second shells 51b, 52b as shown, for example, in FIG. 4.

Second web 42 of monolithic second sheet 32 includes a second plate 64 arranged to lie in closely confronting relation to first plate 64 as shown in FIG. 2 and an array of spaced-apart inwardly projecting domes 65 coupled to second plate 64 as shown best in FIG. 4. In an illustrative embodiment, each dome 65 included in second web 42 is larger than the domes 66 included in first and second shells 51a, 52a as shown, for example, in FIG. 4.

Each inwardly projecting dome 65 in second web 42 has a second base 68 coupled to second plate 64 and a second tip 65T coupled to second base 68 and arranged to lie in spaced-apart relation to second plate 64 as suggested in FIG. 4. Domes 65 can be formed to have any suitable shape and frustoconical and frustopyramidal shapes are shown as an example in FIG. 4. Second tip 65T of dome 65 is arranged to contact first tip 75T of a neighboring dome 75 to cause each companion pair of mating inwardly and outwardly projecting domes 75, 65 to form a resilient deformable post 82 included in deformable elastic bed 16 and arranged to extend between first and second plates 74, 64 as shown, for example, in FIGS. 2 and 4.

As shown illustratively in FIG. 2, first inflatable air bladder 21 is configured to have a wedge shape having six sides.

Second inflatable air bladder 22 is configured illustratively to have a U-shape having six sides. As shown in FIG. 2, first and second inflatable air bladders 21, 22 are arranged to be aligned with one another so that a wedge portion 21w of first inflatable air bladder 21 nests within an open portion 22u of second inflatable air bladder 22. During inflation of inflatable air bladders 21, 22, the interlocking arrangement of inflatable air bladders 21, 22 provides the passenger sitting in vehicle seat 10 with a sensation that adjustable pneumatic passenger-support module 18 has a continuous surface.

An occupant-support base 12 for a vehicle seat 10 illustratively includes a cushion 14 as suggested in FIG. 1. Cushion 14 includes a deformable elastic bed 16 made of an elastomeric material and adapted to support a portion of an occupant P seated on cushion 14 and a first inflatable air bladder 21 coupled to deformable elastic bed 16. First inflatable air bladder 21 is formed to include a first air chamber 48 and a first air-intake port 71 opening into the first air chamber 48.

First inflatable air bladder 21 is made of the elastomeric material and configured to expand from a deflated state characterized by a first volume of air in first air chamber 48 to an inflated state characterized by a relatively greater second volume of air in first air chamber 48 in response to admission of pressurized air 36 into first air chamber 48 through the first air-intake port 71.

As an example, first inflatable air bladder 21 includes inner and outer shells 51a, 51b made of the elastomeric material and arranged to cooperate to define first air chamber 48 therebetween. Inner shell 51b includes an inner plate 79p and an outwardly projecting dome 76 coupled to inner plate 79p and arranged to extend away from inner plate 79p and into first air chamber 48 to support outer shell 51a thereon in the deflated state of first inflatable air bladder 21. Outer shell 51a is arranged to separate from outwardly projecting dome 76 of inner shell 51b in the inflated state of first inflatable bladder 21, and outwardly projecting dome 76 of inner shell 51b is configured to provide means for yieldably urging outer shell 51a away from inner plate 79p of inner shell 51b in the deflated state of first inflatable air bladder 21 to block bottoming-out mating contact of outer shell 51a on inner plate 79p of inner shell 51b during exposure of first inflatable air bladder 21 to an exterior load caused by occupant P seated on cushion 14.

Occupant-support base 12 may also include a seat pan 24 that is arranged to lie alongside cushion 14. Inner shell 51b of first inflatable air bag 21 is retained in a fixed position on seat pan 24.

Cushion 14 includes a monolithic first sheet 31 made of the elastomeric material and configured to include inner shell 51b and inner portions of deformable elastic bed 16. Cushion 14 also includes a monolithic second sheet 32 made of the elastomeric material and configured to include outer shell 51a and outer portions of deformable elastic bed 16. Monolithic first sheet 31 is arranged to mate with monolithic second sheet 32 to cause inner and outer shells 51a, 51b to mate in sealing relation to form first air chamber 48 therebetween. Inner and outer portions of deformable elastic bed 16 mate to form a bladder-receiving cavity 61a (e.g., shell basin) containing first inflatable air bladder 21.

Seat pan 24 is arranged to lie alongside cushion 14. As an example, inner shell 51b of first inflatable air bladder 21 and inner portion of deformable elastic bed 16 is retained in a fixed position on seat pan 24. Monolithic second sheet 32 is arranged to lie in spaced-apart relation to seat pan 24 to locate monolithic first sheet 31 therebetween. Inner shell 51b is arranged to lie on seat pan 24 to cause outwardly projecting domes 76 inner shell 21 to extend away from seat pan 24 toward outer shell 51a.

In one illustrative embodiment, outer shell 51a includes an outer plate 69p and an inwardly projecting dome 66 coupled to outer plate 69p to extend away from outer plate 69p toward outwardly projecting dome 76 of inner shell 51b. Inwardly projecting dome 66 of outer shell 51a is arranged to separate from outwardly projecting dome 76 of inner shell 51b in the inflated state of first inflatable bladder 21. Inwardly and outwardly projecting domes 66, 76 cooperate to form a resilient deformable post 84 inside first inflatable air bladder 21 to block bottoming-out mating contact of outer plate 69p of outer shell 51a on inner plate 79p of inner shell 51b during exposure of first inflatable air bladder 21 to an exterior load caused by an occupant P seated on the cushion.

As shown in FIGS. 8-9b, deformable elastic bed 16 is formed to include a left-wing bed section 91 along one side of cushion 14, a right-wing bed section 93 along an opposite side of cushion 14, and a backrest bed section 92 located between and in angled relation to each left-wing and right-wing bed sections 91, 93. Left-wing and right-wing bed sections 91, 93 are arranged to diverge in a direction extending away from backrest bed section 92. First inflatable air bladder 21 is coupled to backrest bed section 92 and is located in a bladder-receiving cavity 61a, 61b formed in backrest bed section 92 to lie between left-wing and right-wing bed sections 91, 93.

Seat pan 24 is arranged to lie alongside 14 cushion and left-wing, right-wing, and backrest bed sections 91, 92, 93 of deformable elastic bed 16 are retained in fixed positions on seat pan 24. Inner shell 51b of first inflatable air bladder 21 is retained in a fixed position on seat pan 24.

A vehicle seat 110, in accordance with another embodiment of the present disclosure, is illustrated in FIGS. 7-11. Vehicle seat 110 includes a pair of inflatable air bladders 121, 122 that are located in left side wing 186, backrest 188, and right side wing 190 included in cushion 114.

Vehicle seat 110 includes one occupant-support base 111 configured to provide a seat bottom and another occupant-support base 112 configured to provide a seat back arranged to extend upwardly from the seat bottom as shown in FIG. 7. In an illustrative embodiment, seat back 112 includes a cushion 114 including a deformable elastic bed 116 and a pair of inflatable air bladders 121, 122. Deformable elastic bed 116 and inflatable air bladders 121, 122 are made from a suitable elastomeric material. As an example, the pair of inflatable air bladders 121, 122 cooperate to form an adjustable pneumatic passenger-support module 118.

Deformable elastic bed 116 is configured to support a portion of an occupant seated on cushion 114 of seat back 112. Inflatable air bladders 121, 122 may be inflated using pressurized air stream 36 to expand outwardly in outward directions 138 from a deflated state shown in FIGS. 7, 8, and 10 to an inflated state shown in FIG. 11 to provide adjustable torso support for a passenger seated in vehicle seat 110.

Seat back 112 includes a cushion cover 120, a cushion 114, and a seat pan 124 in an illustrative embodiment as shown, for example, in FIGS. 8 and 9. A seat-pan support frame 26 can also be included in vehicle seat 110 to support a seat pan included in seat back 112 or seat bottom 111 as suggested in FIGS. 7 and 9. Cushion 114 is anchored to underlying seat pan 124 using any suitable means and cushion cover 120 is coupled to cushion 114 and/or seat pan 124 using any suitable means and arranged to cover deformable elastic bed 116 and inflatable air bladders 121, 122 as suggested in FIGS. 7-9.

Cushion 114, as shown in FIG. 8, includes a left wing 186, a central backrest 188, and a right wing 190. First inflatable air bladder 121 is configured to lie in left wing 186 of cushion 114 and extend through central backrest 188 of cushion 114 into right wing 190 of cushion 114. Second inflatable air bladder 122 is configured to lie in left wing 186 and extend through central backrest 188 into right wing 190 of cushion 114. As shown in FIG. 8, first and second inflatable air bladders 121, 122 cooperate to provide an adjustable pneumatic passenger-support module 118.

During use of adjustable pneumatic passenger-support module 118, a pump controller 28 is activated by a vehicle passenger to actuate a manifold 30 to direct a source of pressurized air, such as an air pump 34 coupled to an air source 29, to generate a pressurized air stream 36. Pressurized air stream 36 is conducted through a pair of hoses 140a, 140b and then through a pair of associated air-inlet conduits 144, 146 into air chambers 148, 150 formed in inflatable air bladders 121, 122 as suggested in FIG. 8. This causes inflatable air bladders 121, 122 to expand outwardly in outward direction 138 to assume an inflated state as suggested in FIG. 11. It is within the scope of the present disclosure to use any suitable fluid pressure-management system to inflate and deflate inflatable air bladders 121, 122.

First inflatable air bladder 121, as shown in FIG. 8, includes a first backrest section 155, a first left-wing section 157, and a first right-wing section 159. First backrest section 155 is in fluid communication with first left-wing and right-wing sections 157, 159. Pressurized air stream 36 when admitted into first inflatable air bladder 121 moves freely among first backrest section 155, first left-wing section 157, and first right-wing section 159.

Second inflatable air bladder 122, as shown in FIG. 8, includes a second backrest section 156, a second left-wing section 158, and a second right-wing section 160. Second backrest section 156 is in fluid communication with second left-wing and right-wing sections 158, 160. Pressurized air stream 36 when admitted into second inflatable air bladder 121 moves freely among second backrest section 156, second left-wing section 158, and second right-wing section 160.

Deformable elastic bed 116 of cushion 114 is formed to include a left-wing bed section 191, a backrest bed section 192, and a right-wing bed section 193 as suggested in FIG. 8. First and second inflatable air bladders 121, 122 are arranged to lie in backrest bed section 192 and extend outwardly into left-wing bed section 191 and right-wing bed section 193.

As shown in FIG. 9a, backrest bed section 192 of deformable elastic bed 116 includes a top portion 1921, an intermediate portion 1922, and a bottom portion 1923. Intermediate portion 1922 is arranged to interconnect top portion 1921 and bottom portion 1923. As illustrated in FIG. 9a, first and second backrest sections 155, 156 of inflatable air bladders 121, 122 are positioned to lie in intermediate portion 1922 of backrest bed section 192.

Left-wing bed section 191 of deformable elastic bed 116 is formed to include a top portion 1911, an intermediate portion 1912, and a bottom portion 1913. Intermediate portion 1912 is arranged to interconnect top and bottom portions 1911, 1913. As illustrated in FIG. 9a, first and second left-wing sections 157, 158 of associated first and second inflatable air bladders 121, 122 are arranged to extend from first and second backrest sections 155, 156 into intermediate portion 1912 of left-wing bed section 191.

As shown in FIG. 9a, right-wing bed section 193 of deformable elastic bed 116 is formed to include a top portion 1931, an intermediate portion 1932, and a bottom portion 1933. Intermediate portion 1932 is arranged to interconnect top portion 1931 and bottom portion 1933. First and second right-wing sections 159, 160 of first and second inflatable air bladders 121, 122 are arranged to extend from associated first and second backrest sections 155, 156 into intermediate portion 1932 of right-wing bed section 193 as shown in FIG. 9a.

A monolithic first sheet 131 and a monolithic second sheet 132 are mated together to form deformable elastic bed 116 and first and second inflatable air bladders 121, 122 as suggested in FIGS. 9a and 9b. Illustratively, monolithic first and second sheets 131, 132 are made of an elastomeric material.

Monolithic first sheet 131 includes a first web 141 that is configured to form an inner portion of deformable elastic bed 116, a first inner shell 151b that is configured to form an inner portion of first inflatable air bladder 121, and a second inner shell 152b that is configured to form an inner portion of second inflatable air bladder 122 as suggested in FIGS. 9a and 10. Similarly, monolithic second sheet 132 includes a second web 142 that is configured to form an outer portion of deformable elastic bed 116, a first outer shell 151a that is configured to form an outer portion of first inflatable air bladder 121, and a second outer shell 152a that is configured to form an outer portion of second inflatable air bladder 122 as also suggested in FIG. 9a.

As shown in FIGS. 10 and 11, first inner shell 151b of first web 141 includes a shell wall 179w and a shell plate 179p as shown in FIGS. 10 and 11. Shell wall 179w and shell plate 179p cooperate to form a first backrest basin 191b, a first left-wing basin 193b, and a first right-wing basin 195b. First outer shell 151a of second web 142 is formed to include a first backrest basin 191a, a first left-wing basin 193a, and a first right-wing basin 195a. First shells 151a, 151b are sealingly coupled together to cause first backrest basins 191a, 191b to communicate with one another to form a first backrest section 155, to cause first left-wing basins 193a, 193b to communicate with one another to form a first left-wing section 157, and to cause first right-wing basins 195a, 195b to communicate with one another to form a first right-wing section 159.

As shown in FIGS. 10 and 11, second shell 152b of first web 141 includes a shell wall 169w and a shell plate 169p as shown in FIGS. 10 and 11. Shell wall 169w and shell plate 169p cooperate to form a second backrest basin 192a, a second left-wing basin 194a, and a second right-wing basin 196a. Second shells 152a, 152b are sealingly coupled together to cause second backrest basins 192a, 192b to communicate with one another to form a second backrest section 156, to cause second left-wing basins 194a, 194b to communicate with one another to form a second left-wing section 158, and to cause second right-wing basins 196a, 196b to communicate with one another to form a second right-wing section 160.

First inflatable air bladder 121 is also formed to include a first air-intake port 171 opening into first backrest section 155 and mating with first air-inlet conduit 144 as suggested in FIG. 9a. First shells 151a, 151b mate with one another along a first shell interface 154 and cooperate to form first air-intake port 171 therebetween. First shell 151b of first web 141 includes a continuous sealing edge 151bs interrupted by a port-forming edge 151bpf as shown in FIG. 9a. Similarly, first shell 151a of second web 142 includes a continuous sealing edge 151as interrupted by a port-forming edge 151apf as shown in FIG. 9a. When monolithic first sheet 131 is mated to monolithic second sheet 132, sealing edge 151bs of first shell 151b is sealingly coupled to sealing edge 151as of first shell 151a to form first air chamber 148 and port-forming edge 151bpf of first shell 151b is arranged to lie in stationary confronting relation to port-forming edge 151apf of first shell 151a to form first air-intake port 171 therebetween as suggested in FIG. 9a.

Second inflatable air bladder 122 is also formed to include a second air-intake port 172 opening into second right-wing section 160 and mating with second air-inlet conduit 146 as suggested in FIG. 9a. Second shells 152a, 152b mate with one another along a second shell interface 161 and cooperate to form second air-intake port 172 therebetween along second shell interface 161. Second shell 152b of first web 141 includes a continuous sealing edge 152bs as interrupted by a port-forming edge 152bpf as suggested in FIG. 9a. Similarly, second shell 152a of second web 142 includes a continuous sealing edge 152as interrupted by a port-forming edge 152apf as shown in FIG. 4. When monolithic first sheet 131 is mated to monolithic second sheet 132, sealing edge 152bs of second shell 152b is sealingly coupled to sealing edge 152as of second shell 152a to form second air chamber 150 and port-forming edge 152bpf of second shell 152b is arranged to lie in stationary confronting relation to port-forming edge 152apf of second shell 152a to form second air-intake port 172 therebetween.

As shown in FIG. 10, first inflatable air bladder 121 is in a deflated state with pressurized air stream 36 from manifold 30 being turned OFF. A passenger P (in phantom) is shown sitting in vehicle seat 110 with a portion of a passenger's torso being supported by first backrest section 155 of first inflatable air bladder 121. Support is maintained within first inflatable air bladder 121 by a series of outwardly projecting domes 76 formed in first shell 151b of first web 141 and by a series of inwardly projecting domes 66 formed in first shell 151a of second web 142.

When first inflatable air bladder 121 is in the deflated stated, a first tip 66T of dome 66 and a second tip 76T of dome 76 is arranged to lie in confronting relation to one another as shown in FIG. 10. First tip 66T is aligned above second tip 76T so that first tip 66T is supported by second tip 76T to cause a passenger resting on cushion 114 to be supported by the deflated inflatable air bladder 121. First tip 66T of dome 66 is not coupled to second tip 76T of dome 76 so that when first inflatable air bladder 121 is inflated, monolithic second sheet 132 is permitted to move away from monolithic first sheet 131.

As shown in FIG. 11, first inflatable air bladder 121 is in the inflated stated with pressurized air stream 36 from manifold 30 being turned ON. Second inflatable air bladder 122 functions illustratively in the same manner as first inflatable air bladder 121 thus only first inflatable air bladder 121 will be discussed in detail. Passenger P (in phantom) is shown sitting in vehicle seat 110 with the passenger's torso being supported by first left-wing section 157, first backrest section 155, and first right-wing section 159. First left-wing section 157 is appended to first backrest section 155 by a first left-wing anchor 101 interconnecting first monolithic sheet 131 and monolithic second sheet 132 so that first inflatable air bladder 121 is restrained from movement in the area of first left-wing anchor 101.

Similar to first left-wing section 157, first right-wing section 159 is appended to first backrest section 155 by a first right-wing anchor 103 interconnecting first monolithic sheet 131 and second monolithic sheet 132 so that first inflatable air bladder 121 is restrained from movement in the area of first right-wing anchor. First right-wing anchor 103 and first left-wing anchor 101 cooperate to restrain first inflatable air bladder 121 so that the passenger's torso remains in contact with first backrest section 155 throughout inflation of first inflatable air bladder 121 as suggested in FIGS. 10 and 11. As shown in FIGS. 7, 8, and 9, second inflatable air bladder 122 also includes second left-wing and right-wing anchors 102, 104 which function in the same way as first left-wing and right-wing anchors 101, 103 included in first inflatable air bladder 121.

Pressurized air stream 36 is communicated into first inflatable air bladder 121 through first air-inlet conduit 144. First air-inlet conduit 144 is arranged to extend into first air-intake port 171 and formed to include a passageway configured to provide means for conducting pressurized air from a source 34 into first air chamber 148 to change the first inflatable air bladder 121 from the deflated state shown in FIGS. 8 and 10 to the inflated state shown in FIG. 11. In an illustrative embodiment, second air-inlet conduit 146 is arranged to extend away from second inflatable air bladder 122 and through a portion 116p of deformable elastic bed 116 as suggested in FIGS. 8 and 9a.

First web 141 of monolithic first sheet 131 includes a first plate 164 and a series of spaced-apart upwardly projecting domes 76. Each upwardly projecting dome 76 has a first base 68 coupled to first plate 164 and a first tip 76T coupled to first base 68 and arranged to lie in spaced-apart relation to first plate 64.

Second web 142 of monolithic second sheet 132 includes a second plate 174 arranged to mate with first plate 164 as shown in FIG. 9a and a series of spaced-apart downwardly projecting domes 76 as shown best in FIG. 9a. Each downwardly projecting dome 76 has a second base 78 coupled to second plate 174 and a second tip 76T coupled to second base 78 and arranged to lie in spaced-apart relation to second plate 174. Second tip 76T is coupled to first tip 66T to cause each companion pair of mating downwardly and upwardly projecting domes 66, 76 to form a resilient deformable post 82 included in deformable elastic bed 116 and arranged to extend between first and second plates 164, 174 as shown, for example, in FIG. 8.

Once monolithic first and second sheets 131, 132 are formed of an elastomeric material and mated (e.g., joined and welded) during a cushion-manufacturing process, a first inflatable air bladder 121, a second inflatable air bladder 122, and a deformable elastic bed 116 are formed. It is within the scope of this disclosure to locate bladder-receiving portion in an interior region of deformable elastic bed so that inflatable air bladders are surrounded on all sides by portions of deformable elastic bed. It is also within the scope of this disclosure to form a bladder-receiving portion along a perimeter edge of a cushion so that the companion inflatable air bladders are surrounded partly by portions of the companion deformable elastic bed.

As suggested in FIG. 7 and shown in FIG. 8, first and second inflatable air bladders 121, 122 are arranged to mate with one another in an interlocking arrangement. The interlocking arrangement of inflatable air bladders 121, 122 provides a passenger sitting in vehicle seat 110 with a sensation that adjustable pneumatic passenger-support module 118 has a continuous surface during four-way pneumatic adjustment of passenger-support module 118.

Cushion 14, 114 provides support to passengers when inflatable air bladders 21, 22 and 121, 122 are in the deflated state. Support is provided by deformable elastic bed 16, 116. As an example, deformable elastic bed 16, 116 is formed to include a plurality of downwardly extending domes 66 and upwardly extending domes 76 extending into inflatable air bladders 21, 22 and 121, 122. As suggested in FIGS. 5 and 10, downwardly extending domes 66 rest on upwardly extending domes 76 to provide support to the passenger when inflatable air bladders 21, 22 and 121, 122 are in the deflated state.

Deformable elastic bed 116 is formed to include a left-wing bed section 191 along one side of cushion 114, a right-wing bed section 193 along an opposite side of cushion 114, and a backrest bed section 192 located between and in angled relation to each of left-wing and right-wing bed sections 191, 193. Left-wing and right-wing bed sections 191, 193 are arranged to diverge in a direction extending away from backrest bed section 192. Inwardly and outwardly projecting domes 66, 76 are arranged to lie in a central bladder-receiving cavity 139 formed in backrest bed section 192.

In one illustrative embodiment, inner shell 151b further includes an outwardly projecting left-side dome 76 coupled to inner plate 179p and is arranged to lie in a left bladder-receiving cavity 137 formed in left-wing bed section 191 and arranged to extend away from inner plate 179p and into first air chamber 146 to support thereon a companion left-side portion of the outer shell 151a located in left bladder-receiving cavity 137 in the deflated state of first inflatable bladder 121. Left-side portion of the outer shell 151a is arranged to separate from outwardly projecting left-side dome 76 of inner shell 151b in the inflated state of first air bladder 121. Outwardly projecting left-side dome 76 is configured to provide means for yieldably urging left-side portion of the outer shell 151a away from inner plate 179p of inner shell 51b to block bottoming-out mating contact of left-side portion of outer shell 51a and inner plate 79p of inner shell 151b in left bladder-receiving cavity 137 during exposure of first inflatable air bladder 121 to an exterior load caused by an occupant P seated on cushion 114.

In another illustrative embodiment, outer shell 151a further includes an inwardly projecting left-side dome 66 coupled to outer plate 169p and arranged to lie in left bladder-receiving cavity 137 to extend away from outer plate 169p toward outwardly projecting left-side dome 76 of inner shell 151b. Inwardly projecting left-side dome 66 of outer shell 151a is arranged to separate from outwardly projecting left-side dome 76 of inner shell 151b in the inflated state of first inflatable bladder 121. Inwardly and outwardly projecting left-side domes 76, 66 cooperate to form a resilient deformable post 84 inside left-wing bladder section 157 of first inflatable air bladder 121 located in left bladder-receiving cavity 137 of deformable elastic bed 116 to block bottoming-out mating contact of outer plate 169p of outer shell 151b on inner plate 179p of inner shell 151b during exposure of left-wing bladder section 157 of first inflatable air bladder 121 to an exterior load caused by an occupant seated on cushion 114.

Inner shell 151b further includes an outwardly projecting right-side dome 76 coupled to inner plate 179p and is arranged to lie in a right bladder-receiving cavity 135 formed in right-wing bed section 193. Outwardly projecting right-side dome 76 is arranged to extend away from inner plate 179p and into first air chamber 148 to support thereon a companion right-side portion of outer shell 151a located in right bladder-receiving cavity 135 in the deflated state of first inflatable bladder 121. Right-side portion of the outer shell 151a is arranged to separate from outwardly projecting right-side dome 76 in the inflated state of first air bladder 121. Outwardly projecting right-side dome 76 is configured to provide means for yieldably urging right-side portion of the shell 151a away from inner plate 179p of inner shell 151b to block bottoming-out mating contact of right-side portion 193 of outer shell 151a and inner plate 179p of inner shell 151b in right bladder-receiving cavity 135 during exposure of first inflatable air bladder 121 to an exterior load caused by an occupant seated on cushion 114.

Outer shell 151a further includes an inwardly projecting right-side dome 66 coupled to outer plate 169p and arranged to lie in right bladder-receiving cavity 135 and to extend away from outer plate 169p toward outwardly projecting right-side dome 76 of inner shell 151b. Inwardly projecting right-side dome 66 of outer shell 151a is arranged to separate from outwardly projecting right-side dome 76 of inner shell 151b in the inflated state of first inflatable bladder 121. Inwardly and outwardly projecting right-side domes 76, 66 cooperate to form resilient deformable post 84 inside a right-wing bladder section 159 of first inflatable air bladder 121 located in right bladder-receiving cavity 135 of deformable elastic bed 116 to block bottoming-out mating contact of outer plate 169p of outer shell 151a on inner plate 179p of inner shell 151b during exposure of right-wing bladder section 159 of first inflatable air bladder 121 to an exterior load caused by an occupant seated on cushion 114.

A vehicle seat 210 in accordance with another embodiment of the present disclosure is illustrated in FIGS. 12-16. Vehicle seat 210 includes a pair of inflatable air bladders 221, 222 that are located in a backrest 288 formed in cushion 214.

Vehicle seat 210 includes one occupant-support base 211 configured to provide a seat bottom and another occupant-support base 212 configured to provide a seat back arranged to extend upwardly from the seat bottom as shown in FIG. 12. In an illustrative embodiment, seat back 212 includes a cushion 214 including a deformable elastic bed 216 and a pair of inflatable air bladders 221, 222 as suggested in FIGS. 13-14a. Deformable elastic bed 216 and inflatable air bladders 221, 222 are made from a suitable elastomeric material. As an example, the pair of inflatable air bladders 221, 222 cooperate to form an adjustable pneumatic passenger-support module 218.

Deformable elastic bed 216 is configured to support a portion of a passenger seated on cushion 214 in seat back 212. A plurality of spaced-apart resilient deformable posts 82 are included in deformable elastic bed 216. Inflatable air bladders 221, 222 may be inflated using pressurized air stream 36 to expand outwardly in outward directions 238 from a deflated state shown in FIGS. 12-15 to an inflated state shown in FIG. 16 to provide adjustable lumbar support for a passenger seated in vehicle seat 210.

During use of adjustable pneumatic passenger-support module 218, a pump controller 28 is used by a passenger to actuate a manifold 30 to direct a source of pressurized air, such as an air pump 34 coupled to an air source 29, to generate a pressurized air stream 36. Pressurized air stream 36 is conducted through a pair of hoses 240a, 240b and then through a pair of associated air-inlet conduits 244, 246 into air chambers 248, 250 formed in inflatable air bladders 221, 222 as suggested in FIG. 13. This causes inflatable air bladders 221, 222 to expand outwardly in outward directions 238 to assume an inflated state as suggested in FIG. 16. It is within the scope of the present disclosure to use any suitable fluid pressure management system to inflate and deflate inflatable air bladders 221, 222.

Cushion 214, as suggested in FIG. 12 and shown in FIG. 13, includes a left wing 286, a central backrest 288, and a right wing 290. First inflatable air bladder 221 is positioned to lie in central backrest 288 of cushion 214. Second inflatable air bladder 222 is positioned to lie in central backrest 288 of cushion 214 below first inflatable air bladder 221. As shown in FIG. 13, first and second inflatable air bladders 221, 222 cooperate to provide an adjustable pneumatic passenger-support module 218.

Figures 14, 14A:
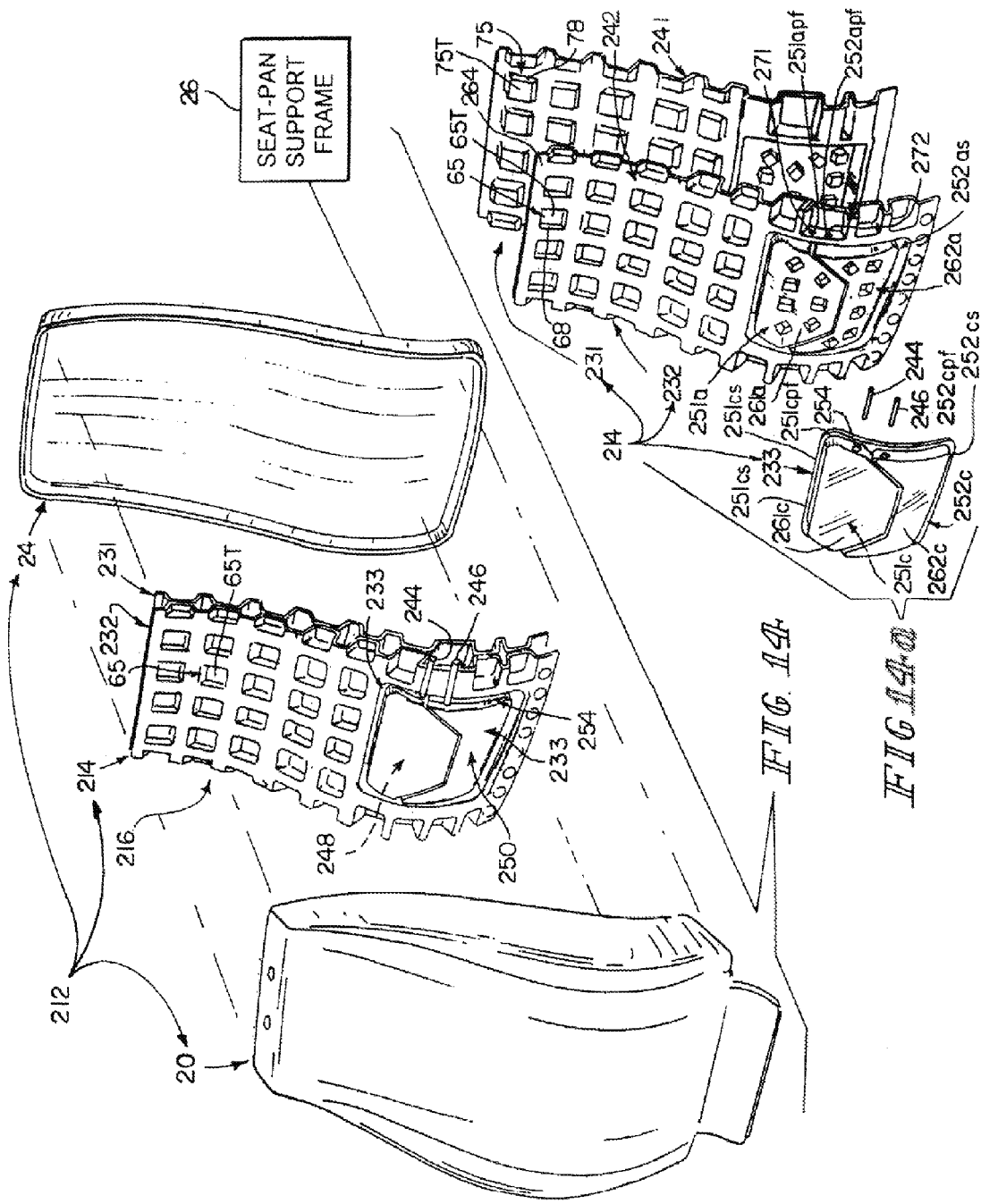
FIG. 14 is an exploded perspective assembly view of the seat back of FIG. 12 showing that the seat back includes, from left to right, a cushion cover, a cushion including a multi-chambered deformable elastic bed formed to include a bladder-receiving cavity containing first and second inflatable air bladders, and a seat pan configured to couple to a seat-pan support frame and to mate with a pad comprising the cushion and the cushion cover.
FIG. 14a is an exploded perspective assembly view of the cushion of FIG. 14 showing that the cushion includes, from left to right, an auxiliary (third) sheet, a monolithic second sheet, a monolithic first sheet, and a pair of air-inlet conduits that are arranged to be mounted between the auxiliary sheet and the monolithic second sheet to provide independent passageways for air to travel into the first and second inflatable bladders formed in the cushion.

Deformable elastic bed 216 of cushion 214 is formed to include a left-wing bed section 291, a backrest bed section 292, and a right-wing bed section 293 as suggested in FIG. 14. First and second inflatable air bladders 221, 222 are arranged to lie in backrest-bed section 292 of deformable elastic bed 216.

As shown in FIG. 14, backrest bed section 292 of deformable elastic bed 216 includes a top portion 2921, an intermediate portion 2922, and a bottom portion 2923. Intermediate portion 2922 is arranged to interconnect top portion 2921 and bottom portion 2923. As illustrated in FIG. 14, first and second inflatable air bladders 221, 222 are positioned to lie in intermediate portion 2922 of backrest bed section 292.

Left-wing bed section 291 of deformable elastic bed 216 is formed to include a top portion 2911, an intermediate portion 2912, and a bottom portion 2913. Intermediate portion 2912 is arranged to interconnect top and bottom portions 2911, 2913. As shown in FIG. 14, right-wing bed section 293 of deformable elastic bed 216 is formed to include a top portion 2931, an intermediate portion 2932, and a bottom portion 1933. Intermediate portion 2932 is arranged to interconnect top portion 1931 and bottom portion 2933. As illustrated in FIG. 14, first and second inflatable air bladders 121, 122 are arranged to lie between intermediate portion 2912 of left-wing bed section 291 and intermediate portion 2932 of right-wing bed section 293.

A monolithic first sheet 231 and a monolithic second sheet 232 are mated together to form deformable elastic bed 216. An outer sheet 233 and monolithic second sheet 232 are mated together to form first and second inflatable air bladders 221, 222 as suggested in FIGS. 14 and 14a. Illustratively, monolithic first and second sheets 231, 232 and auxiliary sheet 233 are made of an elastomeric material.

Monolithic second sheet 232 includes a second web 242 that is configured to form an outer portion of deformable elastic bed 216, a first inner shell 251a that is configured to form an inner portion of first inflatable air bladder 221, and a second inner shell 252a that is configured to form an inner portion of second inflatable air bladder 222 as suggested in FIGS. 13 and 14a. Outer sheet 233 forms an outer portion of second inflatable air bladder 222 as suggested in FIG. 14a.

First inner shell 251b of first web 241 includes a shell wall 279w and a shell plate 279p as shown in FIGS. 15 and 16. First outer shell 251a of first second web 242 includes a shell wall 269w and a shell plate 279p. First outer shell 25a and auxiliary shell 233 are sealingly coupled to one another to form first air chamber 248 therebetween as suggested in FIGS. 14 and 16. Second air chamber 250 is formed similarly to first air chamber 248.

First inflatable air bladder 221 is also formed to include a first air-intake port 271 opening into first air chamber 248 and mating with first air-inlet conduit 244 as suggested in FIGS. 14a-16. Second inflatable air bladder 222 is formed in a manner similar to first inflatable air bladder 221 and only first inflatable air bladder 221 will be described in detail. First inner shell 251a and auxiliary shell 251c mate with one another along a first shell interface 254 and cooperate to form first air-intake port 271 therebetween. First inner shell 251a of second web 242 includes a continuous sealing edge 251as interrupted by a port-forming edge 251apf as shown in FIG. 14a. Similarly, auxiliary sheet 233 includes a continuous sealing edge 251cs interrupted by a port-forming edge 251cpf as shown in FIG. 14a. When monolithic second sheet 232 is mated to outer sheet 233, sealing edge 251as of first inner shell 251a is sealingly coupled to sealing edge 251cs of first auxiliary sheet 233 to form first air chamber 248 and port-forming edge 251apf of first inner shell 251a is arranged to lie in stationary confronting relation to port-forming edge 251cpf of first auxiliary sheet 233 to form first air-intake port 271 therebetween as suggested in FIGS. 14a-16.

As shown in FIG. 15, first inflatable air bladder 221 is shown in a deflated state with the pressurized air stream 36 from manifold 30 being turned OFF. A series of downwardly projecting domes 66 are formed in first inner shell 251a of second web 42. A series of upwardly projecting domes 76 are formed in a first web 241 of monolithic second sheet 231. Domes 66 and 76 may be formed to have any suitable shape and frustopyramidal shapes are shown as an example.

When first inflatable air bladder 221 is in the deflated stated, a first tip 66T of dome 66 and a second tip 76T of dome 76 are arranged to lie in confronting relation to one another. First tip 66T is aligned above second tip 76T so that first tip 66T is supported by second tip 76T to cause a passenger resting on cushion 214 to be supported by deflated inflatable air bladder 221. First tip 66T of dome 66 is coupled to second tip 76T of dome 76 so that when first inflatable air bladder 221 is inflated, monolithic second sheet 232 is retained in position relative to monolithic first sheet 231 while outer sheet 233 moves away from monolithic second sheet 232 toward an expansion perimeter 284 as suggested in FIG. 15 and shown in FIG. 16.

Once monolithic second sheet 32 and outer sheet 233 are formed of an elastomeric material and mated (e.g., joined and welded) during a cushion-manufacturing process, a first inflatable air bladder 221, a second inflatable air bladder 222 and a deformable elastic bed 216 are formed. It is within the scope of this disclosure to locate bladder-receiving portion in an interior region of deformable elastic bed so that inflatable air bladders are surrounded on all sides by portions of deformable elastic bed. It is also within the scope of this disclosure to form a bladder-receiving portion along a perimeter edge of a cushion so that the companion inflatable air bladders are surrounded partly by portions of the companion deformable elastic bed.

An occupant-support base 212 for a vehicle seat 210 includes a cushion 214. Cushion 214 includes a deformable elastic bed 216 made of an elastomeric material and adapted to support a portion of an occupant P seated on cushion 214, a first inflatable air bladder 221, first air-intake port 271, and a bladder support 256. First inflatable air bladder 221 is coupled to deformable elastic bed 216 and formed to include a first air chamber 248. First air-intake port 271 opens into first air chamber 248. Bladder support 256 is coupled to deformable elastic bed 216 and is arranged to underlie first inflatable air bladder 221. Bladder support 256 is defined by an inner shell 251b including an inner plate 279p and an outwardly projecting dome 76 coupled to inner plate 279p and arranged to extend away from inner plate 279p toward first inflatable air bladder 221.

First inflatable air bladder 221 is made of the elastomeric material and configured to expand from a deflated state characterized by a first volume of air in first air chamber 248 to an inflated state characterized by a relatively greater second volume of air in first air chamber 248 in response to admission of pressurized air 36 into first air chamber 248 through first air-intake port 271. First inflatable air bladder 221 includes an outer shell 251a and an auxiliary sheet 233 made of elastomeric material and arranged to cooperate to define first air chamber 248 therebetween. Outer shell 251b includes an outer plate 269p and inwardly projecting dome 66 coupled to outer plate 269p and arranged to extend away from outer plate 269p and auxiliary sheet 233. Outer plate 269p is arranged to support auxiliary sheet 233 thereon in the deflated state of first inflatable air bladder 221.

Auxiliary sheet 233 is arranged to separate from outer plate 269p in the inflated state of first inflatable bladder 221 and outwardly projecting dome 76 of inner shell 251b and inwardly projecting dome 66 of outer shell 251a cooperate to form resilient deformable post 84 to block bottoming-out mating contact of outer plate 269p of outer shell 251a on inner plate 279p of inner shell 251b during exposure of first inflatable air bladder 221 to an exterior load caused by an occupant seated on seat cushion 214.

Seat pan 24 is arranged to lie alongside cushion 214 and inner shell 251b of first inflatable air bladder 221 is retained in a fixed position on seat pan 24. Cushion 214 includes a monolithic first sheet 231 and a monolithic second sheet 232 both made of the elastomeric material. Monolithic first sheet 231 is configured to include inner shell 251b and inner portions of the deformable elastic bed 216. Monolithic second sheet 232 is configured to include the outer portions of the deformable elastic bed 216 and outer shell 251a is arranged to mate in sealing relation with the auxiliary sheet 233 to form first air chamber 248 therebetween. As an example, outer portions of deformable elastic bed 216 included in monolithic second sheet 232 cooperate to form a bladder-receiving cavity 239 receiving at least a portion of first inflatable air bladder 221 therein.

Seat pan 24 is arranged to lie alongside cushion 214 and inner shell 251b and inner portion of the deformable elastic bed 216 is retained in a fixed position on seat pan 24. Monolithic second sheet 232 is arranged to lie in spaced-apart relation to seat pan 24 to locate monolithic first sheet 231 therebetween.

Deformable elastic bed 216 is formed to include a left-wing bed section 291 along one side of cushion 214, a right-wing bed section 293 along an opposite side of cushion 214, and a backrest bed section 292 located between and in angled relation to each of left-wing and right-wing bed sections 291, 293. First inflatable air bladder 221 is coupled to backrest bed section 292 and is arranged to extend into left-wing and right-wing bed sections 291, 293 and are arranged to diverge in a direction extending away from backrest bed section 292. Bladder-receiving cavity 239 is formed in backrest bed section 292 to lie between left-wing and right-wing bed sections 291, 293. Seat pan 24 is arranged to lie alongside cushion 214. Left-wing, right-wing, and backrest bed sections 291, 292, 293 of deformable elastic bed 216 are retained in fixed positions on seat pan 24 and inner shell 251b of bladder support 256 is retained in a fixed position on seat pan 24.

A vehicle seat 310, in accordance with another embodiment of the present disclosure, is illustrated in FIGS. 17-21. Vehicle seat 310 includes a pair of inflatable air bladders 321, 322 that are located in left side wing 386, backrest 388, and right side wing 390 included in cushion 314.

Vehicle seat 310 includes one occupant-support base 311 configured to provide a seat bottom and another occupant-support base 312 configured to provide a seat back arranged to extend upwardly from the seat bottom as shown in FIG. 17. In an illustrative embodiment, seat back 312 includes a cushion 314 including a deformable elastic bed 316 and a pair of inflatable air bladders 321, 322 as suggested in FIGS. 19a and 19b. Deformable elastic bed 316 and inflatable air bladders 321, 322 are made from a suitable elastomeric material. As an example, the pair of inflatable air bladders 321, 322 cooperate to form an adjustable pneumatic passenger-support module 318.

Deformable elastic bed 316 is configured to support a portion of an occupant seated on cushion 314 in seat back 312. A plurality of spaced-apart resilient deformable posts 82 are included in deformable elastic bed 316. Inflatable air bladders 321, 322 may be inflated using pressurized air stream 36 to expand outwardly in outward directions 338 from a deflated state shown in FIGS. 17, 18, and 20 to an inflated state shown in FIG. 21 to provide adjustable torso support for a passenger seated in vehicle seat 310.

Seat back 312 includes a cushion cover 120, cushion 314, and a seat pan 124 in an illustrative embodiment as shown, for example, in FIGS. 18 and 19. A seat-pan support frame 26 can also be included in vehicle seat 310 to support a seat pan 124 included in seat back 312 or seat bottom 311 as suggested in FIG. 19. Cushion 314 is anchored to underlying seat pan 124 using any suitable means and cushion cover 120 is coupled to cushion 314 and/or seat pan 124 using any suitable means and arranged to cover deformable elastic bed 316 and inflatable air bladders 321, 322 as suggested in FIGS. 17-19.

Cushion 314, as shown in FIG. 18, includes a left wing 386, a central backrest 388, and a right wing 390. First inflatable air bladder 321 is configured to lie in left wing 386 of cushion 314 and extend through central backrest 388 of cushion 314 into right wing 390 of cushion 314. Second inflatable air bladder 322 is configured to lie in left wing 386 and extend through central backrest 388 into right wing 390 of cushion 314. As shown in FIG. 18, first and second inflatable air bladders 321, 322 cooperate to provide an adjustable pneumatic passenger-support module 318.

During use of adjustable pneumatic passenger-support module 318, a pump controller 28 is activated by a vehicle passenger to actuate a manifold 30 to direct a source of pressurized air, such as an air pump 34 coupled to an air source 29, to generate a pressurized air stream 36. Pressurized air stream 36 is conducted through a pair of hoses 340a, 340b and then through a pair of associated air-inlet conduits 344, 346 into air chambers 348, 350 formed in inflatable air bladders 321, 322 as suggested in FIG. 18. This causes inflatable air bladders 321, 322 to expand outwardly in outward direction 338 to assume an inflated state as suggested in FIG. 21. It is within the scope of the present disclosure to use any suitable fluid pressure management system to inflate and deflate inflatable air bladders 321, 322.

First inflatable air bladder 321, as shown in FIG. 18, includes a first backrest section 355, a first left-wing section 357, and a first right-wing section 359. First backrest section 355 is in fluid communication with first left-wing and right-wing sections 357, 359. Pressurized air stream 36 when admitted into first inflatable air bladder 321 moves freely among first backrest section 355, first left-wing section 357, and first right-wing section 359.

Second inflatable air bladder 322, as shown in FIG. 18, includes a second backrest section 356, a second left-wing section 358, and a second right-wing section 360. Second backrest section 356 is in fluid communication with second left-wing and right-wing sections 358, 360. Pressurized air stream 36 when admitted into second inflatable air bladder 321 moves freely among second backrest section 356, second left-wing section 358, and second right-wing section 360.

Deformable elastic bed 316 of cushion 314 is formed to include a left-wing bed section 391, a backrest bed section 392, and a right-wing bed section 393 as suggested in FIG. 18. First and second inflatable air bladders 321, 322 are arranged to lie above backrest-bed section 392 and extend outwardly above left-wing bed section 391 and right-wing bed section 393.

As shown in FIG. 19b, backrest bed section 392 of deformable elastic bed 316 includes a top portion 3921, an intermediate portion 3922, and a bottom portion 3923. Intermediate portion 3922 is arranged to interconnect top portion 3921 and bottom portion 3923. As illustrated in FIG. 19a, first and second backrest sections 355, 356 of inflatable air bladders 321, 322 are positioned to lie above intermediate portion 3922 of backrest bed section 316.

Left-wing bed section 391 of deformable elastic bed 316 is formed to include a top portion 3911, an intermediate portion 3912, and a bottom portion 3913. Intermediate portion 3912 is arranged to interconnect top and bottom portions 3911, 1913. As illustrated in FIG. 19b, first and second left-wing sections 357, 358 of associated first and second inflatable air bladders 321, 322 are arranged to extend from first and second backrest sections 355, 356 above intermediate portion 3912 of left-wing bed section 391.

As shown in FIG. 19b, right-wing bed section 393 of deformable elastic bed 316 is formed to include a top portion 3931, an intermediate portion 3932, and a bottom portion 3933. Intermediate portion 3932 is arranged to interconnect top portion 3931 and bottom portion 3933. First and second right-wing sections 359, 360 of first and second inflatable air bladders 321, 322 are arranged to extend from associated first and second backrest sections 355, 356 above intermediate portion 3932 of right-wing bed section 393 as shown in FIG. 19b.

A monolithic first sheet 331 and a monolithic second sheet 332 are mated together to form deformable elastic bed 316. An outer sheet 333 and monolithic second sheet 332 are mated together to form first and second inflatable air bladders 321, 322 as suggested in FIGS. 19a and 19b. Illustratively, monolithic first and second sheets 331, 332 and outer sheet 333 are made of an elastomeric material.

Monolithic second sheet 332 includes a second web 342 that is configured to form an outer portion of deformable elastic bed 316, a first inner shell 351a that is configured to form an inner portion of first inflatable air bladder 321, and a second inner shell 352a that is configured to form an inner portion of second inflatable air bladder 322 as suggested in FIGS. 19b and 20. Outer sheet 333 includes a first auxiliary shell 351c that is configured to form an outer portion of first inflatable air bladder 321 and a second auxiliary shell 352c that is configured to form an outer portion of second inflatable air bladder 322 as suggested in FIG. 19a.

First inner shell 351b of first web 342 includes a shell wall 379w and a shell plate 379p as shown in FIGS. 20 and 21. First outer shell 351a of second web 342 includes a shell wall 369w and a shell plate 369p. Auxiliary sheet 433 and first outer shell 351a are sealingly coupled together to form air chamber 348 therebetween. Second air chamber 350 is also formed in a manner similar to air chamber 348. A first air-intake port 371 is formed in air chamber 348 that opens into first backrest section 355 as suggested in FIGS. 19a and 19b.

As an example, second inner shell 352a of second web 342 is formed to include a second backrest basin 392a, a second left-wing basin 394a, and a second right-wing basin 396a. Second auxiliary shell 352c of outer sheet 333 is formed to include a second backrest basin 392c, a second left-wing basin 394c, and a second right-wing basin 396c. Second shells 352a, 352c are sealingly coupled together to cause second backrest basins 392a, 392c to communicate with one another to form a second backrest section 356, to cause second left-wing basins 394a, 394c to communicate with one another to form a second left-wing section 358, and to cause second right-wing basins 396a, 396c to communicate with one another to form a second right-wing section 360. Second inflatable air bladder 322 is also formed to include a second air-intake port 372 opening into second right-wing section 360 as suggested in FIGS. 19a and 19b.

Second inflatable air bladder 322 is formed in a manner similar to first inflatable air bladder 321 and only construction of first inflatable air bladder 321 will be described in detail. First shells 351a, 351c mate with one another along a first shell interface 354 and cooperate to form first air-intake port 371 therebetween. First inner shell 351a of second web 342 includes a continuous sealing edge 351as interrupted by a port-forming edge 351apf as shown in FIG. 19a. Similarly, first auxiliary shell 351c includes a continuous sealing edge 351cs interrupted by a port-forming edge 351cpf as shown in FIG. 19a. When monolithic second sheet 332 is mated to outer sheet 333, sealing edge 351as of first inner shell 351a is sealingly coupled to sealing edge 351cs of first auxiliary shell 351c to form first air chamber 348 and port-forming edge 351apf of first inner shell 351a is arranged to lie in stationary confronting relation to port-forming edge 351cpf of first auxiliary shell 351c to form first air-intake port 371 therebetween as suggested in FIGS. 19-21.

As shown in FIG. 21, first inflatable air bladder 321 is in the inflated stated as a result of pressurized air stream 36 from manifold 30 being turned ON. Second inflatable air bladder 322 functions illustratively in the same manner as first inflatable air bladder 321, thus only first inflatable air bladder 321 will be discussed in detail. Passenger P (in phantom) is shown sitting in vehicle seat 310 with the passenger's torso being supported by first left-wing section 357, first backrest section 355, and first right-wing section 359. First left-wing section 357 is appended to first backrest section 355 by a first left-wing anchor 301 interconnecting first monolithic sheet 331 and auxiliary sheet 333 so that first inflatable air bladder 321 is restrained from movement in the area of first left-wing anchor 301.

First right-wing section 359 is appended to first backrest section 355 by a first right-wing anchor 303 interconnecting first monolithic sheet 331 and auxiliary sheet 333 so that first inflatable air bladder 321 is restrained from movement in the area of the first right-wing anchor 303. First right-wing and left-wing anchors 301, 303 cooperate to restrain first inflatable air bladder 321 so that the passenger's torso remains in contact with first backrest section 355 throughout inflation of the first inflatable air bladder 321 as suggested in FIGS. 20 and 21. As shown in FIGS. 17, 18, and 19a, second inflatable air bladder 322 also includes second left-wing and right-wing anchors 302, 304 which function in the same way as first left-wing and right-wing anchors 301, 303 included in first inflatable air bladder 321.

Deformable elastic bed 316 is formed to include a left-wing bed section 391 along one side of cushion 314, a right-wing bed section 393 along an opposite side of cushion 314, and a backrest bed section 392 located between and in angled relation to each of left-wing and right-wing bed sections 391, 393. Left-wing and right-wing bed sections 391, 393 are arranged to diverge in a direction extending away from backrest bed section 392. Inner shell 351b further includes outwardly projecting left-side dome 76 coupled to inner plate 379p. Outer shell 351a further includes inwardly projecting left-side dome 66 coupled to outer plate 369p and arranged to lie in a left bladder-receiving cavity 337 formed in left-wing bed section 391 to extend away from outer plate 351a toward outwardly projecting left-side dome 76 of inner shell 351b. Inwardly and outwardly projecting left-side domes 66, 76 cooperate to form resilient deformable post 84 associated with left-wing bed section 391 of the deformable elastic bed to block bottoming-out mating contact of outer plate 351a of outer shell 351a on inner plate 351b of inner shell 351b during exposure of left-wing bladder section of first inflatable air bladder 321 to an exterior load caused by an occupant seated on cushion 314. Auxiliary sheet 333 and left-side portion of outer shell 351a includes inwardly projecting left-side dome 66 cooperate to form therebetween a left-side subchamber of the first air chamber 348L.

Inner shell 351b further includes outwardly projecting right-side dome 76 coupled to inner plate 379p. Outer shell 351a further includes inwardly projecting right-side dome 66 coupled to outer plate 369p and is arranged to lie in a right bladder-receiving cavity 335 formed in right-wing bed section 393 to extend away from outer plate 369p toward outwardly projecting right-side dome 76 of inner shell 351b. Inwardly and outwardly projecting right-side domes 66, 76 cooperate to form resilient deformable post 84 associated with right-wing section 393 of deformable elastic bed 316 to block bottoming-out mating contact of outer plate 369p of outer shell 351a on inner plate 379 of inner shell 351b during exposure of right-wing bladder section of first inflatable air bladder 321 to an exterior load caused by an occupant seated on cushion 314. Auxiliary sheet 333 and right-side portion of outer shell 351a includes inwardly projecting right-side dome 66 cooperate to form therebetween right-side subchamber 348R of first air chamber 348 associated with right-wing bed section 393 of deformable elastic bed 316. Auxiliary sheet 333 and central portion of the outer shell including inwardly projecting dome 66 cooperate to form therebetween a central subchamber 248C of first air chamber 248 associated with central backrest bed section 392. Central subchamber 248C is arranged to interconnect and provide fluid communication between left-side and right-side subchambers 348L, 348R of first air chamber 348.

Figure 22:
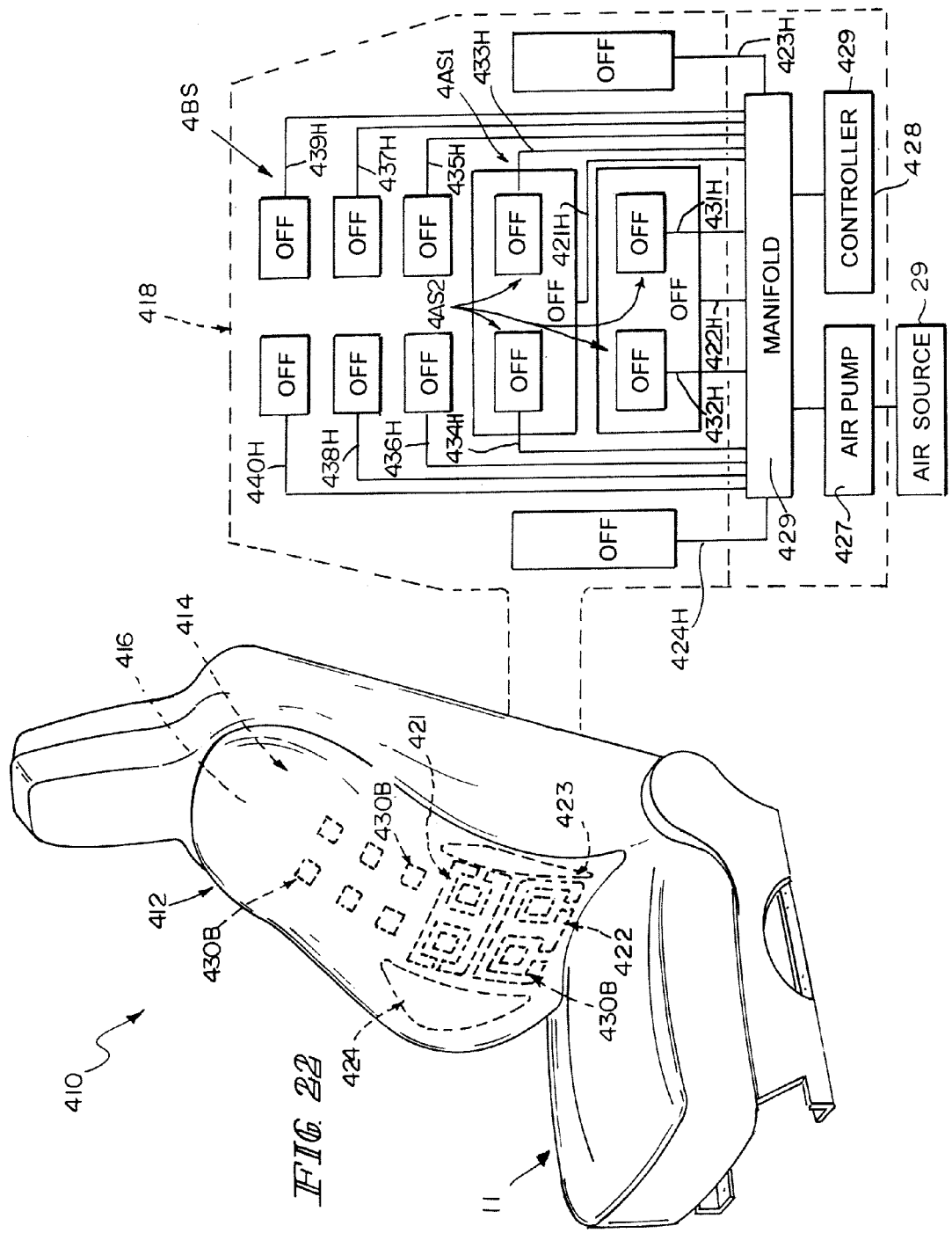
FIG. 22 is a perspective and diagrammatic view a vehicle seat in accordance with another embodiment of the present disclosure showing that the vehicle seat includes a seat bottom and a seat back comprising a cushion including a deformable elastic bed surrounding a pair of half-moon-shaped inflatable bolster bladders (shown in phantom), a pair of rectangle-shaped inflatable lumbar bladders (shown in phantom), and ten square-shaped inflatable massage bladders (shown in phantom) that may be inflated separately by pressurized air coming from a manifold to expand the size of the inflatable bladders relative to the deformable elastic bed as suggested in FIGS. 24 and 26 so that the cushion may be inflated as desired by a passenger sitting on the seat bottom.

A vehicle seat 410, in accordance with another embodiment of the present disclosure, is illustrated in FIGS. 22-31. Vehicle seat 410 includes seat bottom 11 and a seat back 412 as shown in FIG. 22. In an illustrative embodiment, seat back 412 includes a cushion 414 including a deformable elastic bed 416 and a pair of rectangle-shaped lumbar bladders 421, 422, a pair of half-moon shaped inflatable bolster bladders 423, 424, and several inflatable massage bladders 430B as suggested in FIG. 22 and shown in FIGS. 23, 24, and 27-29. Deformable elastic bed 416 is configured to support a portion of a passenger seated on cushion 414 of seat back 412 when the inflatable air bladders are not inflated. Each inflatable bladder 421, 422, 423, 424, 430 may be inflated separately by pressurized air coming from a manifold 429 as suggested in FIGS. 24 and 26 to provide adjustable lumbar support and massage to a passenger seated in vehicle seat 410.

Deformable elastic bed 416 is configured to support a portion of an occupant seated on cushion 414 in seat back 412. A plurality of spaced-apart resilient deformable posts 482 are included in deformable elastic bed 416 as shown in FIGS. 23, 24, and 28. Each inflatable bladder 421, 422, 423, 424, 430 may be inflated individually using pressurized air stream 36 to expand outwardly in outward direction 446 from a deflated state to an inflated state. As shown in FIG. 23, all inflatable bladders 421, 422, 423, 424, 430 are in the deflated state. As shown, for example, in FIG. 24, upper rectangle-shaped lumber bladder 421, right moon-shaped bolster bladder 423, and a third massage bladder 433B are in the inflated state to provide adjustable torso support and massage for a passenger seated in vehicle seat 410.

Seat back 412 includes a cushion cover 420, cushion 414, and a seat pan 425 in an illustrative embodiment as shown, for example, in FIG. 27. A seat-pan support frame 26 can also be included in vehicle seat 410 to support a seat pan 425 included in seat back 412 or seat bottom 11 as suggested in FIG. 27. Cushion 414 is anchored to underlying seat pan 425 using any suitable means and cushion cover 420 is coupled to cushion 414 and/or seat pan 425 using any suitable means and is arranged to cover deformable elastic bed 416 and inflatable bladders 421, 422, 423, 424, 430 as suggested in FIGS. 22 and 27.

Cushion 414, as shown in FIG. 23, includes a left wing 486, a central backrest 488, and a right wing 490. First bolster bladder 423 is arranged to lie in right wing 490 of cushion 414. Second bolster bladder 424 is arranged to lie in left wing 486. First and second lumbar bladders 421, 422 are arranged to lie in between first and second bolster bladders 423, 424 in central backrest 488. Massage bladders 430B are also arranged to lie in central backrest 488. Inflatable bladders 421, 422, 423, 424, 430B cooperate to provide an adjustable pneumatic passenger-support module 418.

Central backrest 488 includes an upper portion 488U and a lower portion 488L as shown in FIGS. 23 and 24. First and second bolster bladders 421, 422 are arranged to lie in lower portion 488L. Massage bladders 430B illustratively are ten separate bladders 431B, 432B, 433B, 434B, 435B, 436B, 437B, 438B, 439B, and 440B. As shown in FIGS. 23 and 24, first, second, third, and fourth massage bladders 431B, 432B, 433B, 434B are also arranged to lie in lower portion 488L of central backrest 488. Remaining fifth, sixth, seventh, eighth, ninth, and tenth inflatable massage bladders 435B, 436B, 437B, 438B, 439B, 440B are arranged to lie in upper portion 488U. As shown in FIG. 23, inflatable massage bladders 431B, 432B, 433B, 434B, 435B, 436B, 437B, 438B, 439B, 440B are arranged into to columns of spaced-apart massage bladders spanning a length of cushion 414.

During use of adjustable pneumatic passenger-support module 418, a pump controller 428 is activated by a vehicle passenger to actuate a manifold 429 to direct a source of pressurized air, such as an air pump 427 coupled to an air source 29, to generate a pressurized air stream 36. Pressurized air stream 36 is conducted through a series of hoses 430H into associated air chambers formed in inflatable bladders 421, 422, 423, 424, 430 as suggested in FIGS. 22-24. It is within the scope of the present disclosure to use any suitable fluid pressure management system to inflate and deflate inflatable air bladders.

Inflatable bladders 421, 422, 423, 424 and deformable elastic bed 416 are formed when a monolithic first sheet 441 and a monolithic second sheet 442 are mated together as shown in FIGS. 25, 26, and 28. Illustratively, monolithic first and second sheets 441, 442 are made of an elastomeric material. As suggested in FIGS. 27 and 28, monolithic first sheet 441 is arranged to lie in confronting relation with seat pan 425. Monolithic second sheet 442 is arranged to locate monolithic first sheet 441 between monolithic second sheet 442 and seat pan 425.

Monolithic first sheet 441 includes a first web 451 that is configured to form an outer portion of deformable elastic bed 416, a first inner lumbar shell 461A that is configured to form an inner portion of first lumbar bladder 421, a second inner lumbar shell 462A that is configured to form an inner portion of second lumbar bladder 422, a first inner bolster shell 463A that is configured to form an inner portion of first bolster bladder 423, and a second inner bolster shell 464A that is configured to form an inner portion of second bolster bladder 424 as suggested in FIG. 28. Monolithic second sheet 442 includes a second web 452 that is configured to form an outer portion of deformable elastic bed 416, a first outer lumbar shell 461B that is configured to form an outer portion of first lumbar bladder 421, a second outer lumbar shell 462B that is configured to form an outer portion of second lumbar bladder 422, a first outer bolster shell 463B that is configured to form an outer portion of first bolster bladder 423, and a second outer bolster shell 464B that is configured to form an outer portion of second bolster bladder 424 as suggested in FIG. 28.

As suggested in FIGS. 25, 26, and 28, first lumbar shells 461A, 461B are coupled together sealingly to establish first lumbar bladder 421. Second lumbar shells 462A, 462B are coupled together sealing to establish second lumbar bladder 422. First bolster shells 463A, 463B are coupled together sealingly to establish first bolster bladder 423. Second bolster shells 464A, 464B are coupled together sealingly to establish second bolster bladder 424.

First lumbar bladder 421 is formed in a manner similar to first and second bolster bladders 423, 424 and second lumbar bladder 422 and only construction of first lumbar bladder 421 will be discussed in detail. First lumbar shells 461A, 461B mate with one another along a first lumbar-shell interface 454. An air-intake port (not shown) may be formed in first lumbar-shell interface 454. First inner lumbar shell 461A of first web 451 includes a continuous sealing edge 461AS that may be interrupted by a port-forming edge as shown in FIG. 28. Similarly, first outer lumbar shell 461B includes a continuous sealing edge 461BS that may be interrupted by a port-forming edge. When monolithic first sheet 441 is mated with monolithic second sheet 442, sealing edge 461AS of first inner lumbar shell 461A is coupled sealingly to sealing edge 461BS of first outer lumbar shell 461B to form a first lumbar air chamber 468. In one embodiment, an air-intake port may be formed by confronting port-forming edges that may be included in each lumbar shell 461A, 462B. In another embodiment, an air-intake port may be established by forming an aperture in one of the shells.

As shown in FIGS. 23 and 25, all the inflatable bladders 421, 422, 423, 424, 430 are in the deflated state with pressurized air stream 36 from manifold 429 being turned OFF to each bladder. While in the deflated state, a passenger sitting in vehicle seat 410 is supported by a series of free-standing domes 46D2, 47D2 that are formed in inflatable bladders 421, 422, 423, 424, 430. As shown, for example, in FIG. 25, a first dome 47D2 is formed in first outer lumbar shell 461B of second monolithic sheet 442 and is arranged to extend away from first monolithic sheet 441 to support a passenger sitting in vehicle seat 410 when first inflatable lumbar bladder 421 in the deflated state. As another example, a second dome 46D2 is formed in first bolster shell 463A of first monolithic sheet 441 and is arranged to extend away from seat pan 425 into first bolster air chamber 473 to support a passenger when first inflatable bolster bladder 423 in the deflated state.

When the pneumatic passenger-support module 418 is in the deflated state, a passenger resting on cushion 414 is supported by deformable elastic bed 416. As shown in FIG. 28, deformable elastic bed 416 is formed as the result of mating a monolithic first sheet 441 and a monolithic second sheet 442 together. Monolithic first sheet 441 is formed to include several upwardly extending free-standing domes 46D1, 46D2. As an example, domes 46D2 are formed in a lower portion of monolithic first sheet 441 as part of shells 461A, 462A, 463A, 464A and have a first height 4H1 which is generally the thickness of the cushions. Domes 46D1 are formed in an upper portion of monolithic first sheet 441 and have a second height 4H2. Second height 4H2 is less than first height 4H1, and as an example, is about half the first height 4H1. Domes 46D1 are configured to mate with downwardly extending domes 47D1 formed in second monolithic sheet 442.

Monolithic second sheet 442 is formed to include several downwardly extending free-standing domes 47D1 (shown in FIG. 28) and several upwardly extending free-standing domes 47D2 (shown in FIGS. 25, 26, and 28). In the illustrative embodiment shown in FIGS. 25 and 26, upwardly extending domes 47D2 are formed as part of lumbar shells 461B, 462B and are configured extend generally the thickness of cushion 414 and have first height. Downwardly extending free-standing domes 47D1, in comparison, are generally included in second web 452 and are arranged to align and mate with upwardly extending domes 46D3 of second monolithic sheet 442 to establish spaced-apart resilient deformable posts 482 as suggested in FIG. 28. Resilient deformable posts 482 generally span the thickness of cushion 414 and have a third height which may be equal to first height 4H1 or slightly greater than first height 4H1.

An example of use, as shown in FIGS. 24 and 26, first inflatable bolster and lumbar bladders 421, 423 and third inflatable massage bladder 433B are in the inflated state as a result of pressurized air stream 36 from manifold 30 being turned ON to bladders 421, 423, and 433. Second inflatable bolster bladder 424 functions illustratively in the same manner as first inflatable bolster bladder 423, and thus, only first inflatable bolster bladder 423 will be discussed in detail. Second inflatable lumbar bladder 422 operates illustratively in the same manner as first inflatable lumbar bladder 421, and thus, only first inflatable lumbar bladder 421 will be discussed in detail. Finally, the other inflatable massage bladders 431B, 432B, 434B, 435B, 436B, 437B, 438B, 439B, 440B operate in illustratively in the same manner as third inflatable massage bladder 433B, and thus, only third inflatable massage bladder 433B will be discussed in detail.

First inflatable bolster bladder 423 is formed as a result of coupling first bolster shell 463A of first monolithic sheet 441 to first bolster shell 463B of second monolithic shell. As shown in FIG. 25, first bolster shell 463B is arranged to lie in confronting relation with second dome 46D2 formed in first bolster shell 463A when first inflatable bolster bladder 423 is in the deflated position. As a result of admitting pressurized air into first bolster chamber 473, first bolster shell 463B moves away from first bolster shell 463A as shown in FIG. 25.

First inflatable lumbar bladder 421 is formed as a result of coupling first inner lumbar shell 461A of first monolithic sheet 441 to first lumbar inner shell 461A of second monolithic shell. As shown in FIG. 25, first inner lumbar shell 461A is arranged to lie confronting relation with first outer lumbar shell 461B. First dome 47D2 is formed in first outer lumbar shell 461B to provide support to passengers when first inflatable lumbar bladder 421 is in the deflated state. After pressurized air 36 has been admitted into first lumbar air chamber 471, first outer lumbar shell 461B moves away from first inner lumbar shell 461A to cause the first outer lumbar shell 461B to establish an expansion perimeter 461P as shown in FIG. 26. As illustrated in FIGS. 25 and 26, first outer lumbar shell 461B is formed to include a massage-bladder cavity 444. Bladder-receiving cavity 444 is defined by upwardly extending dome 47D2 and a downwardly extending moat 4M1 arranged to surround dome 47D2. As an example, third massage unit 433 is arranged to lie in bladder-receiving cavity 444 as suggested in FIGS. 23-26, 28, and 29.

As shown in FIG. 29, massage units 430 are each arranged to lie in individual bladder-receiving cavities 444 formed in monolithic second sheet 442. First and second massage units 431, 432 are arranged to lie in bladder-receiving cavities 444 formed in second outer lumbar shell 462B of second monolithic sheet 442. As an example, first and second massage units 431, 432 are arranged to lie in bladder-receiving cavities 444 formed in second outer lumbar shell 462B of second lumbar bladder 422. Similarly, second and third massage units 433, 434 are arranged to lie in bladder-receiving cavities 444 formed in first outer lumbar shell 461B of first lumbar bladder 421. Fifth, sixth, seventh, eighth, ninth, and tenth inflatable massage units 435, 436, 437, 438, 439 and 440 are arranged to lie in bladder-receiving cavities 444 formed in second web 452 of second monolithic sheet 442.

Third inflatable massage bladder 433B operates in illustratively the same manner as other inflatable massage bladders 431B, 432B, 434B, 435B, 436B, 437B, 438B, 439B, 440B, and thus, only third inflatable massage bladder 433B will be discussed in detail. Third inflatable massage bladder 433B is formed in response to joining a third massage unit 433 to first outer lumbar shell 461B of second monolithic sheet 442. Third massage unit 443 illustratively includes a first expansion layer 4331, a second expansion layer 4332, and a third expansion layer 4333 as shown in FIGS. 25, 26, 30 and 31. Third expansion layer 4333 is coupled to an outer surface of first outer lumbar shell 461B to establish a first massage chamber 456 therebetween as shown in FIG. 26. First expansion layer 4331 is coupled to second expansion layer 4332 to establish a second massage chamber 458 therebetween as illustrated, for example, in FIG. 26. Second expansion layer 4332 is coupled to third expansion layer 4333 to provide a passageway 478 that allows pressurized air 36 to communicate between the first and second massage chambers 456, 458 as shown in FIG. 26.

As shown in FIGS. 30 and 31, third expansion layer 4333 includes a flange portion 4333F and a dome portion 4333D. Dome portion 4333D is appended to the flange portion 4333F and arranged to extend outwardly away from second monolithic sheet 442. Dome portion 4333D is sized so that dome 47D2 is receive therein when third inflatable massage unit 433 is coupled to first outer lumbar shell 461B. Moat 4M1 is sized to receive flange portion 4333F therein and dome portion 4333D of third expansion layer 4333 is coupled to moat 4M1 by flange portion 4333F as shown in FIGS. 25 and 26. As illustrated in FIG. 25, dome portion 4333D includes a perimeter wall 494 and a ceiling 496 extending between the perimeter wall 494. A first aperture 475 is formed in ceiling 496 and is configured to provide a portion of passageway 478. A second aperture 476 is formed in perimeter wall 494 that is coupled sealingly to hose 433H so that pressurized air 36 may be admitted to third inflatable massager bladder 433B.

Second expansion layer 4332 includes a perimeter 4332P and an aperture 474 as shown in FIG. 31. Aperture 474 is formed to open into second massage chamber 458 and is aligned with first aperture 475 of third expansion layer 4333 to provide passageway 478. First expansion layer 4331 includes a perimeter 4331P that is coupled sealingly to perimeter 4332P of second expansion layer 4332 so that second massage chamber 458 is formed between first and second expansion layer 4331, 3332. Passageway 478 allows pressurized air 36 to move freely between first and second massage chambers 456, 458 as shown in FIG. 26. First expansion layer 4331 is also formed to include a pattern of surface features 498 which are illustratively three rectangle-shaped raised concentric rings.

Third inflatable massage bladder 433B, as shown in FIG. 25, is in a deflated state as a result of pressurized air stream 36 from manifold 30 being turned OFF to massage bladder 433B. As a result, ceiling 496 of third expansion layer 4333 is arranged to lie in confronting relation on first upwardly extending dome 47D2. Second expansion layer 4332 is also arranged to lie in confronting relation on ceiling 496 of third expansion layer 4333 and first expansion layer 4331 is arranged to lie in confronting relation on second expansion layer 4332. In the illustrative embodiment of third inflatable massage bladder 433B illustrated in FIGS. 25 and 26, third inflatable massage bladder 433B extends above expansion perimeter 461P of first inflatable lumbar bladder 421 a first distance 401 when third inflatable air bladder 433B is in the deflated state. In another embodiment, the third inflatable massage bladder is arranged to lie below an expansion perimeter of the inflatable lumbar bladder when the third inflatable massage bladder is in the deflated state.

In comparison, third inflatable massage bladder 433B is in an inflated state as a result of pressurized air stream 36 from manifold 30 being turned ON. Pressurized air moves third expansion layer 4333 away from first dome 47D2 of second monolithic sheet 442. At the same time, pressurized air 36 moves through passageway 478 from first massage chamber 456 to second massage chamber 458 to cause second expansion layer 4332 to move away from third expansion layer 4333 and assume a concave shape that faces upwardly and to cause first expansion layer 4331 to move away from second expansion layer 4332 and assume a convex shape that faces upwardly. When third inflatable massage bladder 433B is in the inflated state, third inflatable massage bladder 433B extends above expansion perimeter 461P of first inflatable lumbar bladder 421 a relatively larger second distance 402 as shown in FIG. 26.

Cushion 414 is illustratively formed in a series of steps as suggested in FIGS. 27-30. In one illustrative cushion-manufacturing process, first monolithic sheet 441 is formed to include several upstanding domes 46D1, 46D2 and several shells 461A, 462A, 463A, 464A (in phantom) as shown in FIG. 28. Second monolithic sheet 442 is formed to include several downwardly extending domes 47D1, several downwardly extending moats 4M1, and several upwardly extending domes 47D2 as illustrated in FIG. 28. Next, first and second monolithic sheets 441, 442 are mated together (e.g., joined and welded) to form first and second lumbar bladders 421, 422, and first and second bolster bladders 423, 424 as shown in FIG. 29.

In a separate massage-bladder manufacturing process, third extension layer 4333 is joined to second extension layer 4332 so that passageway 478 is established. Next, first extension layer 4331 and second extension layer 4332 are mated together at their associated perimeters 4331P, 4332P so that an inflatable massage bladder is establish as shown in FIG. 30. In a final step, inflatable massage units 431, 432, 433, 434, 435, 436, 438, 439, 440 are coupled to second monolithic sheet 442 as suggested in FIG. 29 and a cushion is established by coupling hoses 430H to associated inflatable bladder 421, 422, 423, 424, 430B as shown in FIG. 27. Seat back 412 is finally established when cushion cover 420 and cushion 414 are mated with seat pan 425 as suggested in FIG. 27.

An occupant-support base 412 for a vehicle seat 410 illustratively includes a cushion 414 as suggested in FIG. 22. Cushion 414 includes a deformable elastic bed 416 made of an elastomeric material and adapted to support a portion of an occupant P seated on cushion 414 and a first inflatable air bladder 421 coupled to deformable elastic bed 416. First inflatable air bladder 421 is formed to include a first air chamber 471 and a first air-intake port 448 opening into first air chamber 471.

First inflatable air bladder 421 is made of the elastomeric material and configured to expand from a deflated state characterized by a first volume of air in first air chamber 471 to an inflated state characterized by a relatively greater second volume of air in first air chamber 471 in response to admission of pressurized air 36 into first air chamber 471 through the first air-intake port 448.

As an example, first inflatable air bladder 421 includes inner and outer shells 461A, 461B made of the elastomeric material and arranged to cooperate to define first air chamber 471 therebetween. Inner shell 461A includes an inner plate 479p and an outwardly projecting dome 76 coupled to inner plate 479p and arranged to extend away from inner plate 479p and into first air chamber 471 to support outer shell 461B thereon in the deflated state of first inflatable air bladder 421. Outer shell 461B is arranged to separate from outwardly projecting dome 76 of inner shell 461A in the inflated state of first inflatable bladder 421, and outwardly projecting dome 76 of inner shell 461A is configured to provide means for yieldably urging outer shell 461B away from inner plate 479p of inner shell 461A in the deflated state of first inflatable air bladder 421 to block bottoming-out mating contact of outer shell 461B on inner plate 479p of inner shell 461A during exposure of first inflatable air bladder 421 to an exterior load caused by occupant P seated on cushion 414.

461A As shown in FIGS. 23a to 24a, outer shell 461B includes outer plate 469p and laterally spaced-apart first and second outwardly projecting domes 47D2 coupled to outer plate 469p and interconnected by a central pliable portion 469pc of outer plate 469p. Central pliable portion 469cp of outer plate 469p is draped over outwardly projecting dome 46D2 of inner shell 461A to position outwardly projecting dome 46D2 of inner shell 461A to lie in a space 470 provided between the laterally spaced apart first and second outwardly projecting domes 47D2 of outer shell 461B in the deflated state of first inflatable bladder 421. Central pliable portion 469pc of outer plate 469p is separated from inner plate 461A and outwardly projecting dome 46D2 of inner shell 461A to position outwardly projecting dome 46D2 of inner shell 461A to lie outside of space 470 provided between laterally spaced apart first and second outwardly projecting domes 47D1 of outer shell 461B in the inflated state of first inflatable bladder 421.

Cushion 414 comprises a bladder system 4BS coupled to deformable elastic bed 416 and configured to include first inflatable bladder 421 and an inflatable first massage bladder 431B associated with first inflatable bladder 421. First massage bladder 431B is formed to include a first massage air chamber 4561 and a first massage air-intake port 476 opening into first massage air chamber 4561. Inflatable first massage bladder 431B is configured to expand from a deflated state characterized by a first volume of air in first massage air chamber 4561 to an inflated state characterized by a relatively greater second volume of air in first massage air chamber 4561 in response to admission of pressurized air 36 into first massage air chamber 4561 through first massage air-intake port 4761. Inflatable first massage bladder 431B is coupled to first inflatable bladder 421 to move therewith relative to deformable elastic bed 416 in response to inflation and deflation of first inflatable bladder 416.

Bladder system 4BS further includes an inflatable second massage bladder 432B associated with inflatable air bladder 421 and arranged to lie in spaced-apart relation to inflatable first massage bladder 431B. Inflatable second massage bladder 432B is associated with first inflatable bladder 421 and formed to include a second massage air chamber 4562 and a second massage air-intake port 4762 opening into second massage air chamber 4562. Inflatable second massage bladder 432B is configured to expand from a deflated state characterized by a first volume of air in second massage air chamber 4562 to an inflated state characterized by a relatively greater second volume of air in second massage air chamber 4562 in response to admission of pressurized air 36 into second massage air chamber 4562 through second massage air-intake port 4762. Inflatable second massage bladder 432B is coupled to first inflatable bladder 421 to move therewith relative to deformable elastic bed 461 in response to inflation and deflation of first inflatable bladder 421.

Bladder system 4BS further includes first air-supply means 4AS1 for controlling inflation and deflation of inflatable air bladder 421 and second air-supply means 4AS2 independent of first air-supply means 4AS1 for controlling inflation and deflation of inflatable first and second massage bladders 431B, 432B independent of inflation and deflation status of inflatable air bladder 421 to inflate each of first and second massage bladders 431B, 432B alone or in combination to assume static pressure levels in first and second massage air chambers 4561, 4562 at the option of a passenger seated on occupant-support base 412 against cushion 414 and to inflate and deflate first and second massage bladders 431B, 432B in sequence in accordance with a selected inflation/deflation cycling plan to provide a massaging sensation to a seated passenger at the option of the passenger seated on occupant-support base 412 against cushion 414.

Cushion 414 comprises a monolithic first sheet 431 made of the elastomeric material and configured to include inner shell 461A and inner portions of the deformable elastic bed 461. A monolithic second sheet 432 made of the elastomeric material and configured to include outer shell 461B and outer portions of the deformable elastic bed 416 and a massage unit 431 arranged to mate with outer shell 461B of monolithic second sheet 432 to form first massage air chamber 4561 therebetween. Massage unit 431 lies above outer shell 461B of monolithic second sheet 432 and in spaced-apart relation to inner shell 461A of monolithic first sheet 431 to locate outer shell 461B of monolithic second 432 sheet therebetween.

Deformable elastic bed 416 includes a central backrest bed section 492 and left-wing and right-wing bed sections 491, 493 lying in spaced-apart diverging relation to one another to locate central backrest bed section 492 therebetween and to diverge in a direction extending away from central backrest bed section 492, first inflatable air bladder 421 is an inflatable lumbar bladder 421 arranged to extend into a central bladder-receiving cavity formed in central backrest bed 492. Bladder system 4BS further includes a left bolster bladder 424 arranged to lie in a left bladder-receiving cavity formed in left-wing bed section 491 and a right bolster bladder 423 arranged to lie in a right bladder-receiving cavity formed in right-wing bed section 493 and each of the left and right bolster bladders 423, 424 is formed to include an air chamber and an air-intake port opening into said air chamber.

Cushion 214, 314, 414 provides support to passengers when inflatable air bladders 221, 222, 321, 322, 421, 422, 431B, 432B, 433B, 434B, 435B, 436B, 438B, 439B, and 440B are in the deflated state. Support is provided by deformable elastic bed 216, 316, 416. As an example, deformable elastic bed 216, 316, 416 is formed to include a plurality of downwardly extending domes 66, 466 and upwardly extending domes 76, 476. In some embodiments, downwardly extending domes 66 and upwardly extending domes 76 mate to form resilient deformable posts 82 that may lie below inflatable air bladders 221, 222 and 321, 322.

In other embodiments, downwardly extending domes 47D1 and upwardly extending domes 46D1 may mate to form resilient deformable posts 482 in some portions of cushion 414. In other portions of cushion 414, upwardly extending domes 47D2, 46D2 may extend substantially the entire thickness of cushion 414 and not mate with any downwardly extending domes 46D1. These free-standing upwardly extending domes 47D2 may lie in inflatable lumbar bladders 421, 422 and in inflatable bolster bladders 423, 424 and on inflatable lumbar bladders 421, 422.

Manufacturing efficiency of cushions 14, 114, 214, 314, 414 is maximized as a result of cushions 14, 114 being formed by mating two monolithic sheets together, cushions 214, 314 being formed by mating three monolithic sheets together, and cushion 414 being formed by mating two monolithic sheets together and several separately manufactured inflatable massage bladders. Manufacturing efficiency of vehicle seats 10, 110, 210, 310 and 410 is maximized as result of integrating the deformable elastic bed and the inflatable air bladders into cushions 14, 114, 214, 314, and 414. Seat manufacturing is maximized as a result of minimizing the complexity and the number of components comprising vehicle seats 10, 110, 210, 310, 410.

Cushions 114 and 314 include first and second inflatable air bladders 121, 122 and 321, 322. Each of the inflatable air bladders included in cushions 114, 314 includes a left-wing section, a right-wing section, and a backrest section. The left-wing sections, right-wing sections, and backrest sections provide the passenger maximized adjustable support. Inflatable air bladders 121, 122 and 321, 322 cooperate to establish an associated pneumatically adjustable passenger support module 118 and 218 that maximizes support for a passenger's torso.

Use of inflatable air bladders included in cushions 114, 314 by the passenger is simplified as a result of left-wing section, right-wing section and backrest section being coupled together in fluid communication with one another. As a result, inflation of the inflatable air bladders by the passenger causes the left-wing section, the right-wing section, and the backrest section to inflate at the same time. It is within the scope of this disclosure to control inflation and deflation of each left-wing section, right-wing section, and backrest section included in the inflatable air bladders. In comparison, optimal use of inflatable bladders 421, 422, 423, 424, 430 by the passenger is provided as a result of each bladder being controlled separately from every other bladder.

The invention claimed is:

1. An occupant-support base for a vehicle seat, the occupant-support base comprising
a cushion including a deformable elastic bed made of an elastomeric material and adapted to support a portion of an occupant seated on the cushion, a first inflatable air bladder coupled to the deformable elastic bed and formed to include a first air chamber and a first air-intake port opening into the first air chamber, and a bladder support coupled to the deformable elastic bed and arranged to underlie the first inflatable air bladder, wherein
the bladder support is defined by an inner shell including an inner plate and an outwardly projecting dome coupled to the inner plate and arranged to extend away from the inner plate toward the first inflatable air bladder,
the first inflatable air bladder is made of the elastomeric material and configured to expand from a deflated state characterized by a first volume of air in the first air chamber to an inflated state characterized by a relatively greater second volume of air in the first air chamber in response to admission of pressurized air into the first air chamber through the first air-intake port,
the first inflatable air bladder includes an outer shell and an auxiliary sheet made of elastomeric material and arranged to cooperate to define the first air chamber therebetween, the outer shell includes an outer plate and an inwardly projecting dome coupled to the outer plate and arranged to extend away from the outer plate and the auxiliary sheet, the outer plate is arranged to support the auxiliary sheet thereon in the deflated state of the first inflatable air bladder, the auxiliary sheet is arranged to separate from the outer plate in the inflated state of the first inflatable bladder, and the outwardly projecting dome of the inner shell and the inwardly projecting dome of the outer shell cooperate to form a resilient deformable post to block bottoming-out mating contact of the outer plate of the outer shell on the inner plate of the inner shell during exposure of the first inflatable air bladder to an exterior load caused by an occupant seated on the seat cushion.

2. The occupant-support base of claim 1, further comprising a seat pan arranged to lie alongside the cushion and wherein the inner shell of the first inflatable air bladder is retained in a fixed position on the seat pan.

3. The occupant-support base of claim 2, wherein the cushion comprises a monolithic first sheet made of the elastomeric material and configured to include the inner shell and inner portions of the deformable elastic bed and a monolithic second sheet made of the elastomeric material and configured to include the outer portions of the deformable elastic bed and wherein the outer shell of the monolithic second sheet is arranged to mate in sealing relation with the auxiliary sheet to form the first air chamber therebetween.

4. The occupant-support base of claim 3, wherein the outer portions of the deformable elastic bed included in the monolithic second sheet cooperate to form a bladder-receiving cavity receiving at least a portion of the first inflatable air bladder therein.

5. The occupant-support base of claim 3, further comprising a seat pan arranged to lie alongside the cushion and wherein the inner shell and the inner portion of the deformable elastic bed is retained in a fixed position on the seat pan.

6. The occupant-support base of claim 3, further comprising a seat pan arranged to lie alongside the cushion and wherein the monolithic second sheet is arranged to lie in spaced-apart relation to the seat pan to locate the monolithic first sheet therebetween.

7. The occupant-support base of claim 1, wherein the deformable elastic bed is formed to include a left-wing bed section along one side of the cushion, a right-wing bed section along an opposite side of the cushion, and a backrest bed section located between and in angled relation to each of the left-wing and right-wing bed sections, and the first inflatable air bladder is coupled to the backrest bed section and arranged to extend into the left-wing and right-wing bed sections are arranged to diverge in a direction extending away from the backrest bed section, a bladder-receiving cavity formed in the backrest bed section to lie between the left-wing and right-wing bed sections.

8. The occupant-support base of claim 7, further comprising a seat pan arranged to lie alongside the cushion and wherein the left-wing, right-wing, and backrest bed sections of the deformable elastic bed are retained in fixed positions on the seat pan and the inner shell of the bladder support is retained in a fixed position on the seat pan.

9. The occupant-support base of claim 1, wherein the deformable elastic bed is formed to include a left-wing bed section along one side of the cushion, a right-wing bed section along an opposite side of the cushion, and a backrest bed section located between and in angled relation to each of the left-wing and right-wing bed sections, the left-wing and right-wing bed sections are arranged to diverge in a direction extending away from the backrest bed section, the inner shell further includes an outwardly projecting left-side dome coupled to the inner plate, the outer shell further includes an inwardly projecting left-side dome coupled to the outer plate and arranged to lie in a left bladder-receiving cavity formed in the left-wing bed section and extend away from the outer plate toward the outwardly projecting left-side dome of the inner shell, the inwardly and outwardly projecting left-side domes cooperate to form a resilient deformable post associated with the left-wing bed section of the deformable elastic bed to block bottoming-out mating contact of the outer plate of the outer shell on the inner plate of the inner shell during exposure of the left-wing bladder section of the first inflatable air bladder to an exterior load caused by an occupant seated on the cushion, and the auxiliary sheet and a left-side portion of the outer shell including the inwardly projecting left-side dome cooperate to form therebetween a left-side subchamber of the first air chamber.

10. The occupant-support base of claim 1, wherein the deformable elastic bed is formed to include a left-wing bed section along one side of the cushion, a right-wing bed section along an opposite side of the cushion, and a backrest bed section located between and in angled relation to each of the left-wing and right-wing bed sections, the left-wing and right-wing bed sections are arranged to diverge in a direction extending away from the backrest bed section, wherein the inner shell further includes an outwardly projecting right-side dome coupled to the inner plate, the outer shell further includes an inwardly projecting right-side dome coupled to the outer plate and arranged to lie in a right bladder-receiving cavity formed in the right-wing bed section and extend away from the outer plate toward the outwardly projecting right-side dome of the inner shell, the inwardly and outwardly projecting right-side domes cooperate to form a resilient deformable post associated with the right-wing section of the deformable elastic bed to block bottoming-out mating contact of the outer plate of the outer shell on the inner plate of the inner shell during exposure of the right-wing bladder section of the first inflatable air bladder to an exterior load caused by an occupant seated on the cushion, and the auxiliary sheet and a right-side portion of the outer shell including the inwardly projecting right-side dome cooperate to form therebetween a right-side subchamber of the first air chamber associated with the right-wing bed section of the deformable elastic bed.

11. The occupant-support base of claim 10, wherein the inner shell further includes an outwardly projecting left-side dome coupled to the inner plate, the outer shell further includes an inwardly projecting left-side dome coupled to the outer plate and arranged to lie in a left bladder-receiving cavity formed in the left-wing bed section and extend away from the outer plate toward the outwardly projecting left-side dome of the inner shell, the inwardly and outwardly projecting left-side domes cooperate to form a resilient deformable post associated with the left-wing bed section of the deformable elastic bed to block bottoming-out mating contact of the outer plate of the outer shell on the inner plate of the inner shell during exposure of the left-wing bladder section of the first inflatable air bladder to an exterior load caused by an occupant seated on the cushion, the auxiliary sheet and a left-side portion of the outer shell including the inwardly projecting left-side dome cooperate to form therebetween a left-side subchamber of the first air chamber associated with the left-wing section of the deformable elastic bed, the auxiliary sheet and a central portion of the outer shell including the inwardly projecting dome cooperate to form therebetween a central subchamber of the first air chamber associated with the central backrest bed section and arranged to interconnect and provide fluid communication between the left-side and right-side subchambers of the first air chamber.

* * * * *